(12) United States Patent
Nose et al.

(10) Patent No.: US 10,704,204 B2
(45) Date of Patent: Jul. 7, 2020

(54) RAILWAY SLEEPER AND RAILWAY-SLEEPER MANUFACTURING METHOD

(71) Applicant: Braskem S.A., Camacari (BR)

(72) Inventors: Guilherme Longa Nose, Sao Paulo (BR); Daniel Wenzer Trevizan, Itatiba (BR); Luiz Francisco Muniz da Silva, Sao Paulo (BR); Jorge Luis Goudene Spada, Sao Paulo (BR); Claudio Pereira da Silva Zamith, Sao Paulo (BR); Walter Vidon Junior, Sao Paulo (BR); Renato Teixeira Vargas, Sao Paulo (BR)

(73) Assignee: Braskem S.A., Camaçari, BA (BR)

( * ) Notice: Subject to any disclaimer, the term of this patent is extended or adjusted under 35 U.S.C. 154(b) by 164 days.

(21) Appl. No.: 15/525,693

(22) PCT Filed: Nov. 11, 2015

(86) PCT No.: PCT/BR2015/050215
§ 371 (c)(1),
(2) Date: May 10, 2017

(87) PCT Pub. No.: WO2016/074056
PCT Pub. Date: May 19, 2016

(65) Prior Publication Data
US 2018/0327977 A1 Nov. 15, 2018

Related U.S. Application Data

(60) Provisional application No. 62/078,062, filed on Nov. 11, 2014.

(51) Int. Cl.
*E01B 3/46* (2006.01)
*B29C 48/21* (2019.01)
(Continued)

(52) U.S. Cl.
CPC ............... *E01B 3/46* (2013.01); *B29C 48/00* (2019.02); *B29C 48/131* (2019.02); *B29C 48/21* (2019.02);
(Continued)

(58) Field of Classification Search
CPC ..... E01B 3/46; E01B 3/44; E01B 3/00; E01B 3/26; E01B 3/42; E01B 3/18; E01B 3/30
See application file for complete search history.

(56) References Cited

U.S. PATENT DOCUMENTS 1,586,052 A * 5/1926 Snyder ...................... E01B 3/16
238/61
4,728,030 A * 3/1988 Hodgson ................... E01B 3/16
238/61
(Continued)

FOREIGN PATENT DOCUMENTS

BR 7201396 U 3/1994
BR 0204410 A 5/2003
(Continued)

*Primary Examiner* — Jason C Smith
(74) *Attorney, Agent, or Firm* — Duane Morris LLP

(57) ABSTRACT

The present invention describes a railroad sleeper (1) for fixation of at least a pair of rails (2,2') of a railroad network, comprising a contact surface (3), wherein each rail of the pair of rails (2,2') is fixed spaced apart from each other, the railroad sleeper (1) being configured by comprising a hollow sector (4) delimited by association of the contact surface (3) with the anchorage walls (5,5'), thus establishing a free portion (17) adjacent to the anchorage walls (5,5') and opposite the contact surface (3). The present invention further describes an embodiment in which the hollow sector (4) of the railroad sleeper is delimited by a support surface and the process of manufacturing a railroad sleeper.

24 Claims, 24 Drawing Sheets

(51) Int. Cl.
*B29C 48/03* (2019.01)
*B29C 48/88* (2019.01)
*E01B 3/44* (2006.01)
*B29C 48/00* (2019.01)
*B29K 23/00* (2006.01)
*B29K 509/08* (2006.01)

(52) U.S. Cl.
CPC .............. *B29C 48/911* (2019.02); *E01B 3/44* (2013.01); *B29K 2023/12* (2013.01); *B29K 2509/08* (2013.01)

(56) References Cited

U.S. PATENT DOCUMENTS

| | | | | |
|---|---|---|---|---|
| 5,836,512 | A * | 11/1998 | Briggs | ............ E01B 3/16 238/60 |
| 6,749,103 | B1 * | 6/2004 | Ivanov | ............ B23K 31/02 204/298.12 |
| 2002/0062545 | A1 * | 5/2002 | Niedermair | ............ E01B 3/10 29/417 |
| 2005/0106406 | A1 * | 5/2005 | Curtis | ............ B32B 21/08 428/537.1 |
| 2007/0108308 | A1 * | 5/2007 | Keightley | ............ E01B 3/46 238/29 |
| 2008/0035747 | A1 * | 2/2008 | Yuan | ............ B29C 48/151 238/84 |
| 2008/0179418 | A1 * | 7/2008 | Brough | ............ E01B 3/46 238/85 |
| 2008/0265047 | A1 * | 10/2008 | Powers | ............ E01B 3/46 238/85 |
| 2010/0170956 | A1 * | 7/2010 | Cadwell | ............ E01B 3/46 238/85 |
| 2011/0155820 | A1 * | 6/2011 | Djerf | ............ E01B 3/46 238/85 |
| 2018/0327977 | A1 * | 11/2018 | Nose | ............ E01B 3/44 |

FOREIGN PATENT DOCUMENTS

| | | |
|---|---|---|
| CN | 101457504 A | 6/2009 |
| CN | 101759898 A | 6/2010 |
| CN | 102248653 A | 11/2011 |
| DE | 4344253 A1 | 6/1995 |
| WO | 2010/096911 A1 | 9/2010 |

\* cited by examiner

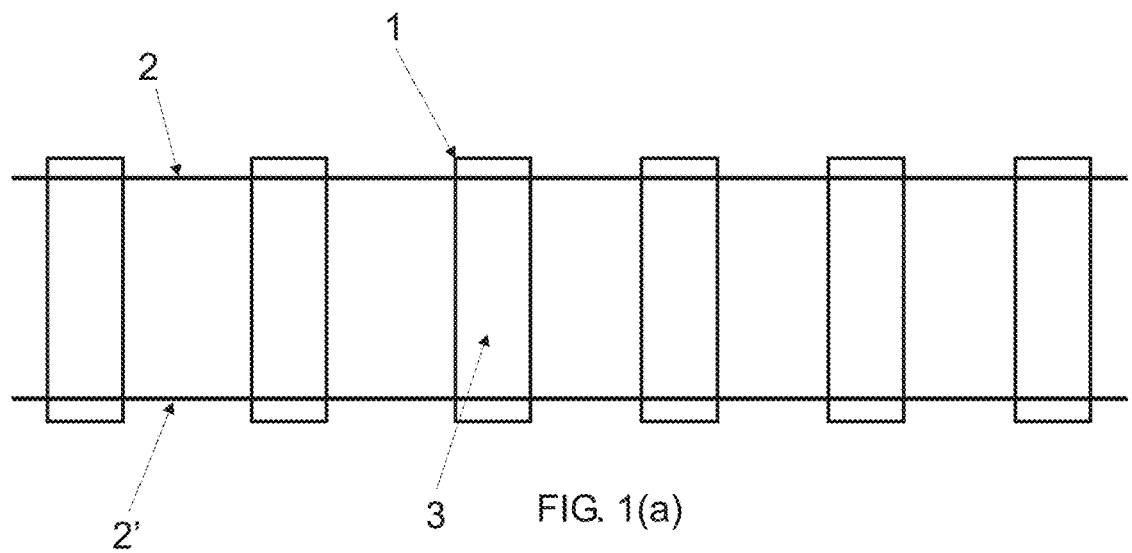
FIG. 1(a)
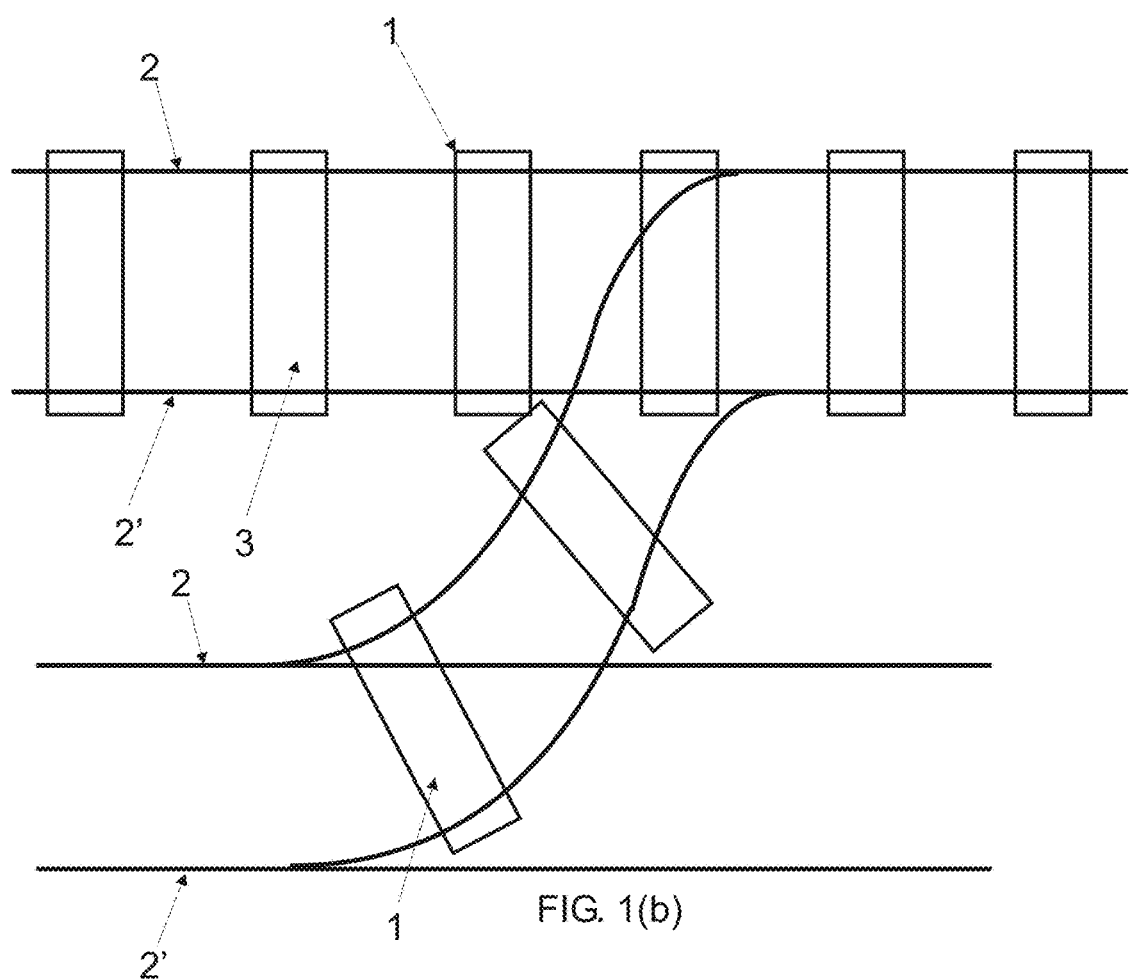
FIG. 1(b)
FIG. 1

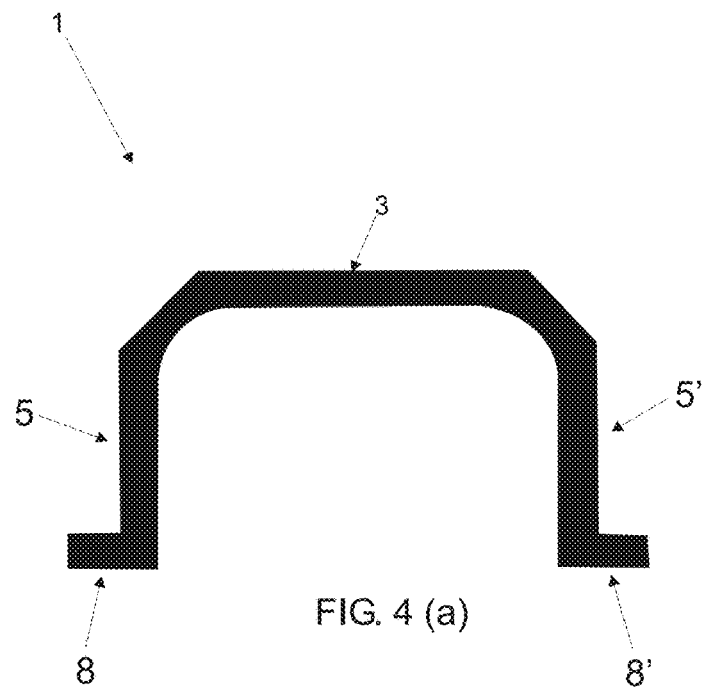
FIG. 4 (a)
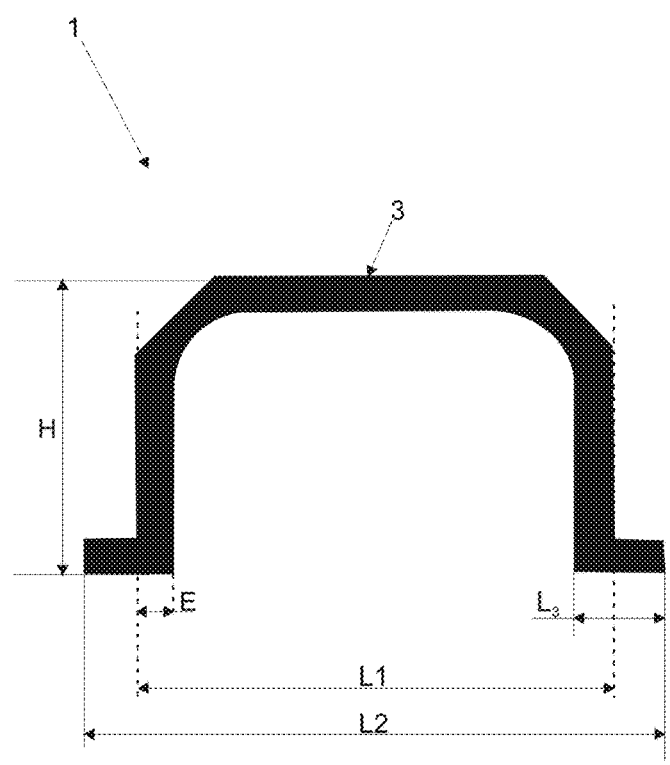
FIG. 4 (b)
FIG. 4

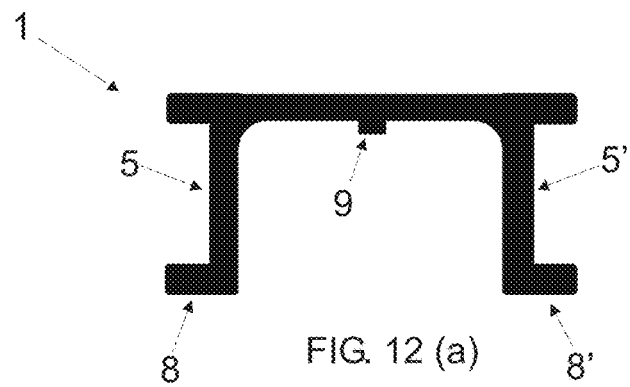
FIG. 12 (a)
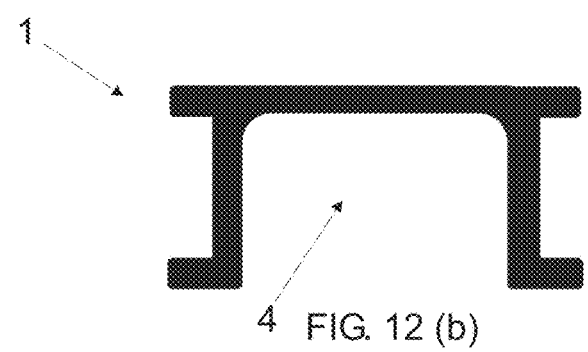
FIG. 12 (b)
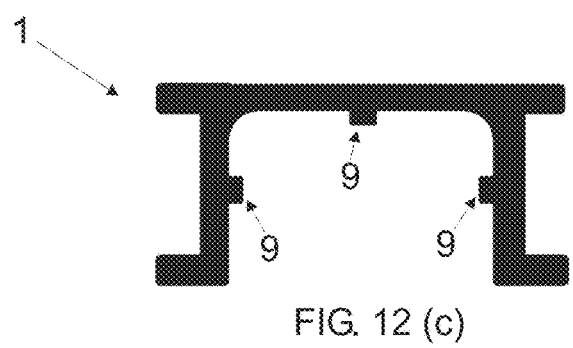
FIG. 12 (c)
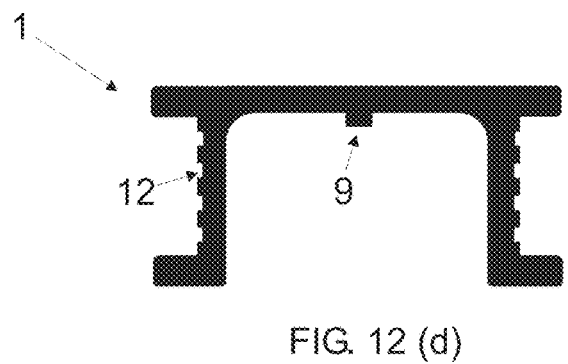
FIG. 12 (d)
FIG. 12

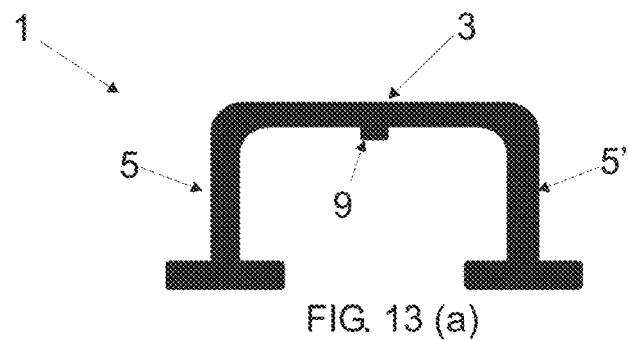
FIG. 13 (a)
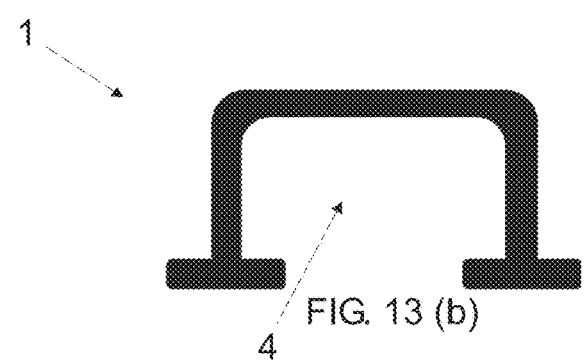
FIG. 13 (b)
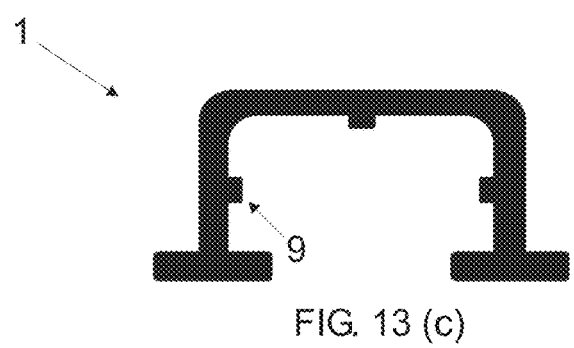
FIG. 13 (c)
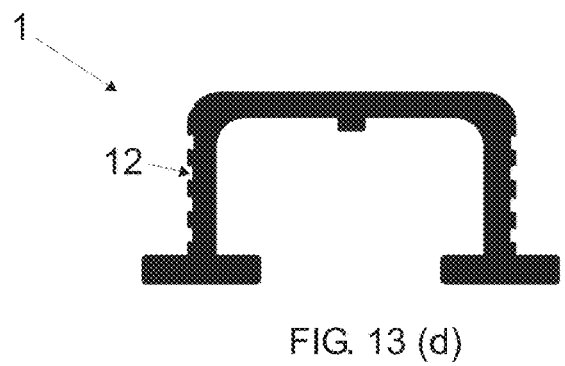
FIG. 13 (d)
FIG. 13

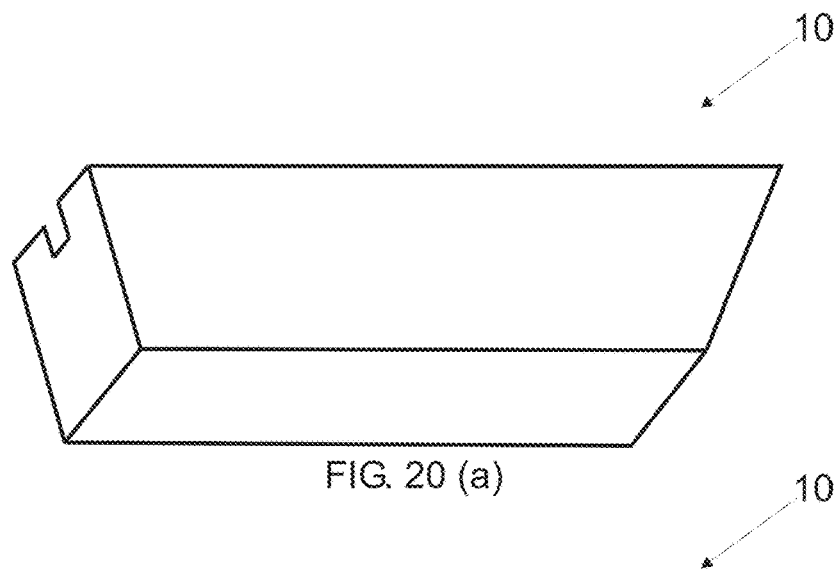
FIG. 20 (a)
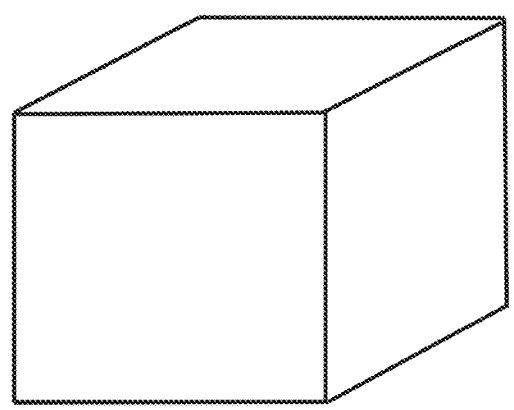
FIG. 20 (b)
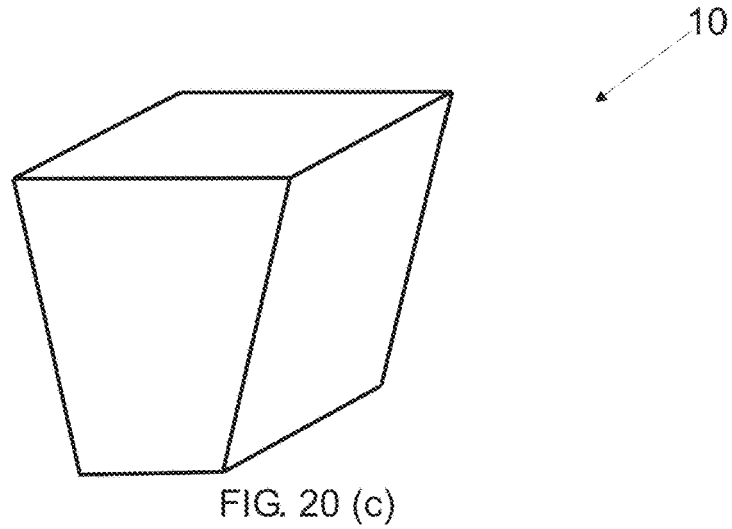
FIG. 20 (c)
FIG. 20

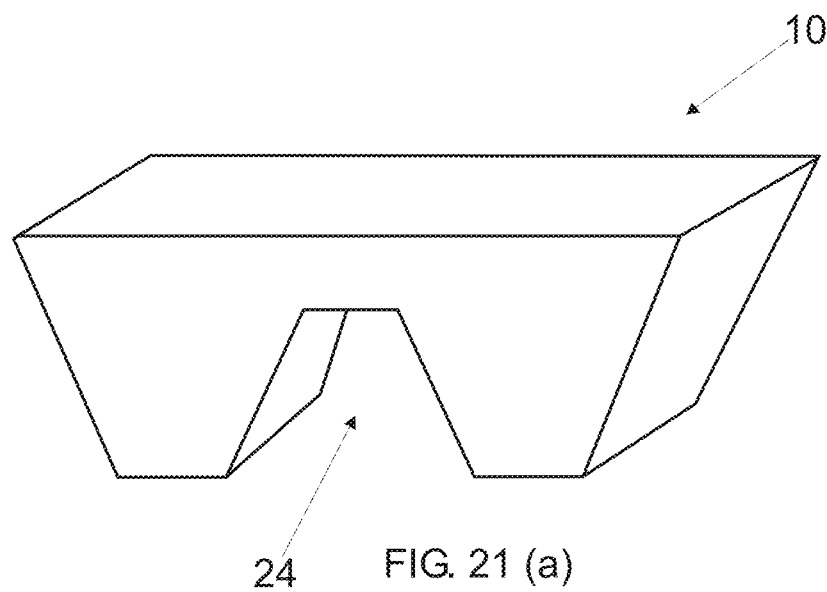
FIG. 21 (a)
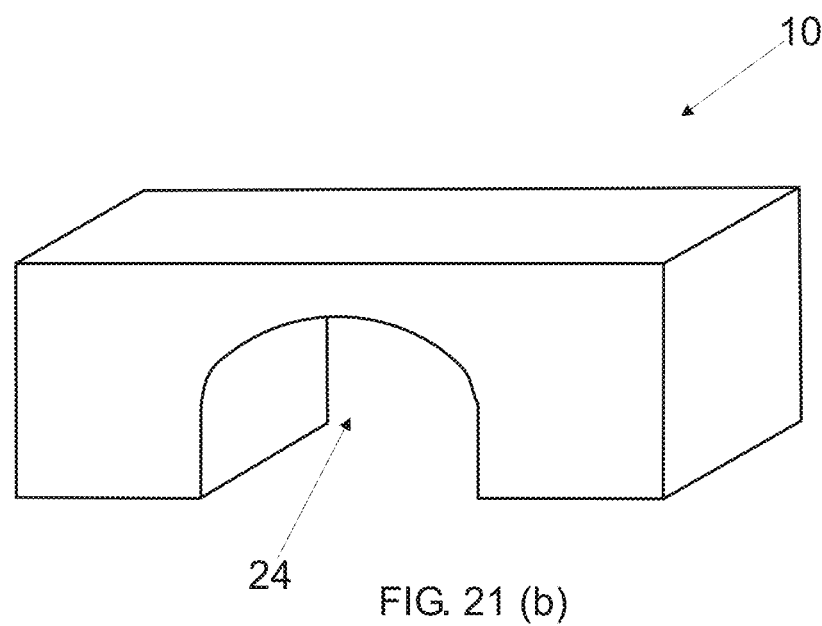
FIG. 21 (b)
FIG. 21

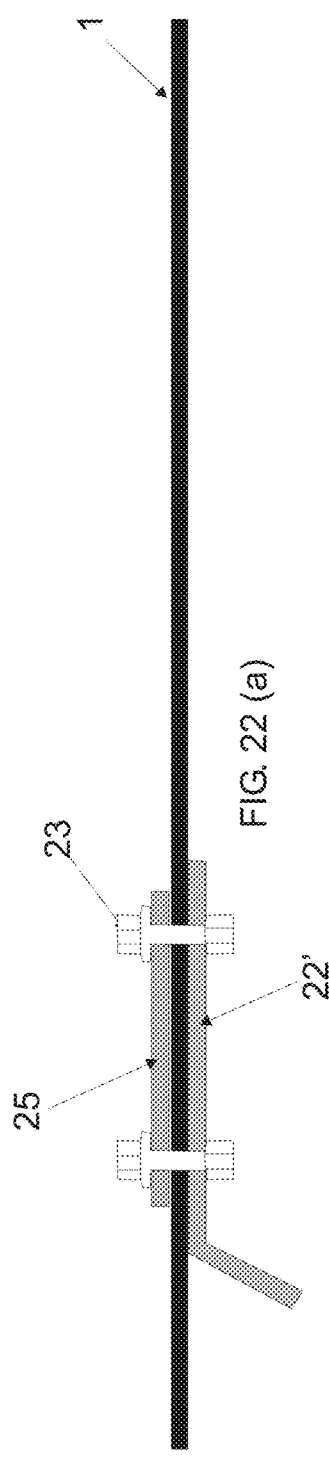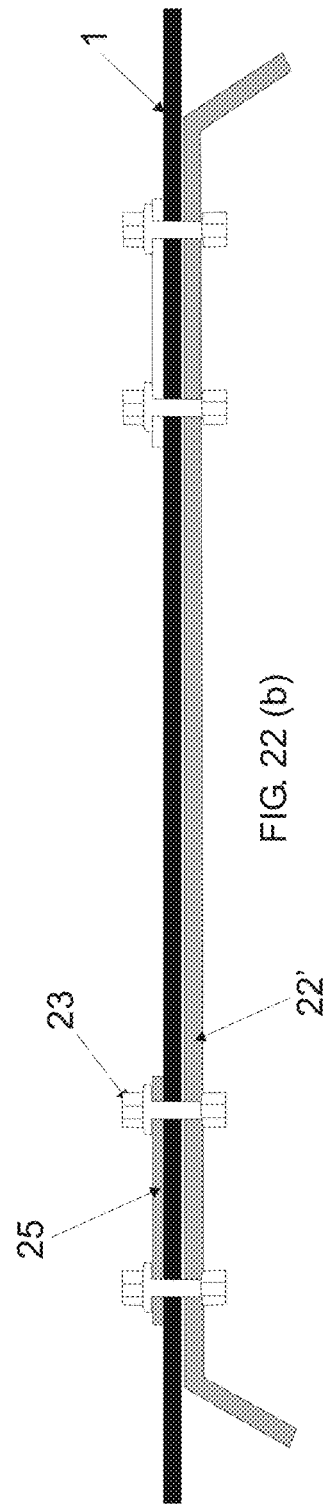
FIG. 22 (a)
FIG. 22 (b)
FIG. 22

RAILWAY SLEEPER AND RAILWAY-SLEEPER MANUFACTURING METHOD

The present invention relates to a railroad sleeper and to a process for manufacturing a railroad sleeper. More specifically, the present invention relates to a railroad sleeper provided with a hollow sector and to the process of making it.

DESCRIPTION OF THE PRIOR ART

Railroader sleeper represent one of the various components of a railroad network and, in conjunction with the ballast and other fixing elements, promote correct anchorage (fixation) of the rails on which the coaches travel.

The great majority of the elements disclosed in the prior art is made of wood (about 90%), the rest being steel, concrete or recycled-plastic sleepers.

A wooden sleeper has useful life estimated in a few decades, so that, after this period, it is necessary to replace it. The estimate that over 3 million wooden sleepers are replaced each year, coupled with the legal restrictions relating to the use of determined types of this raw material causes the sector to look for alternatives to the element in question.

An alternative concentrated on the use of sleepers made of wood, steel, concrete, reforestation-wood, plastic (be it recycled or virgin).

The use of sleepers made of virgin plastic exhibited good behavior. On the other hand, the use of this type of sleeper is restricted to passenger-transportation railroads, of narrow gage, subject to efforts other than those resulting from a load system.

As to the recycled plastic sleepers, these were used in a few railroad networks and represented serious structural problems, with endemic dissemination of cracks, warping and fixation problems.

Basically, with a recycled sleeper it becomes difficult to obtain homogeneity in the material constituting the sleeper. Thus, due to the structural problems detected and the accidents (derailment) generated, the use of this type of sleeper becomes virtually impossible.

Concrete sleepers, in spite of being widespread in railroad networks around the world, have not proved to be suitable for the characteristics of the railroad beds and ballasts of the lines existing in some countries (such as Brazil), due to the great inertia and rigidity of the commercial models that are most commonly available.

This fact tends to cause high break of ballast and, as a result, increase the railroad-maintenance costs, besides enabling the occurrence of accidents.

Classified according to their shape, concrete sleepers may be of the single-block type, formed by a single rigid and continuous piece, are subjected to great bending moments, which appear at different sections of the sleeper.

There are also concrete sleepers of the twin-block type (mixed sleepers), composed by two rigid blocks of reinforced concrete arranged under each rail and joined by a flexible steel bar.

Thanks to the elasticity of the beam, the two blocks of concrete will be immune to most stresses of static bending and alternating bending, which sleepers made of pre-stressed concrete hardly resist.

Among concrete sleepers, there are also poly-block sleepers, wherein two reinforced-concrete blocks are arranged at the ends in conjunction of an intermediate piece, also made from concrete. The blocks of the sides, as well as the intermediate one, are joined by steel means of rods having high elastic limit, stressed and anchored at the ends.

A few advantages with regard to the use of concrete sleepers over wooden sleepers can be cited: for example, concrete sleepers have durability of about 50 years, exhibit lateral and vertical rigidity by virtue of their larger mass and elastic fixation.

Further, concrete sleepers enable easy and rapid replacement of the rails, as well as an increase in the useful life thereof and reduction in the bending stresses (on the rail), by virtue of the stability of the railroad.

Additionally, with concrete sleepers, the frequency of derailments is reduced and, as a result, there is an improvement in the trip quality and a significant reduction in the cost of permanent maintenance.

On the other hand, the use of concrete sleepers presents a few disadvantages, such as higher transportation cost, due to the greater weight of this sleeper as compared with the wood ones, as well as the questionable re-use of the sleeper after the occurrence of derailment.

Additionally, using concrete sleepers, the fixation systems are not adjustable to the rail wear and to the widening of the railroad. Further, there is the need for expensive equipment for installing and maintaining the railroads and, in some situations, damage may by caused to the ballast due to the great weight of the sleeper.

As already mentioned, in addition to concrete and plastic sleepers, the prior art further discloses sleepers made of steel. Steel sleepers exhibit satisfactory behavior when in use. On the other hand, they may have high and uncertain costs, since their weight depends directly on the price of the steel, which is extremely instable.

The fixation of this type of sleeper is usually made by means of screws and chestnuts and need permanent maintenance. Further, the fixation by means of screw ends up weakening the sleeper due to the bores made therein.

As advantages of this type of sleeper, one can cite the possibility of recycling, long useful life (about 60 years), is inert and non-toxic, exhibits low installation cost, its transportation is simple and it non-combustible by virtue of its manufacture material.

As disadvantages, the use of steel sleepers requires a greater number of interventions and change in the tamping area. Further, this type of sleeper may entail the interruption of the trip, due to the isolation jeopardy and still may undergo corrosion problems.

With regard to wooden sleepers, these should be previously) treated (chemically), in order to be suitable for use. Obviously, such a chemical treatment is harmful to the environment.

Said chemical treatment stations are responsible for storing the sleepers and for applying preservatives, with a view to prolong the useful life of the sleeper and preventing the proliferation of fungi and insects.

Besides being a long process, comprising a number of steps, the process of treating sleepers may cause various environmental problems, such as air pollution, due to the breaking of storage tanks, treatment cylinders and tubing that contain the preserving agents.

Additionally, the absorption, inhalation and ingestion of chemical products on the part of employees is not rare. Also the use of herbicides and pesticides may contaminate the soil and the streams, causing changes in the behavior of the fauna and the possibility of extinction of species.

It is further possible to use sleepers made from reforestation wood, this type of sleeper exhibiting resistance significantly lower than that of hard wood.

Additionally, the impossibility of treating sleepers with some products (such as creosote) that are strongly aggressive to the environment enables the sleeper to be attached by biological agents, such as bacteria and white ants, resulting in an extremely short life time (on the order of three to four years), which is much shorter than the useful life of sleepers made from hard wood.

The present invention aims at overcoming the problems existing in the use of the above-mentioned sleepers by means of the structural configuration and process of manufacturing a railroad sleeper.

The proposed sleeper does not have restrictions as to its use, being suitable for use on railroad lines in both construction and operation, for transporting loads and/or passengers.

Plastic sleepers (either virgin or recycled) known from the prior art do not exhibit optimized combination between weight of the piece and elasticity module.

Most known plastic proposals imitate exactly the shape of an wooden sleeper, making the piece heavier and consuming not only more raw material, but also man-hour and hour-machine for making the pieces. Such factors make the production process slow and increase the final price of the sleepers.

The present invention proposes a railroad sleeper, preferably but not exclusively made of polypropylene with fiberglass, manufactured from a high-productivity process, preferably extrusion, further having a structural shape that enables one to achieve and rigidity close to those of the hard-wood sleepers, as well as competitive costs.

Additionally, the sleeper proposed in the present invention has a reduced final price, which facilitates transportation and installation of the piece, enabling the use of standard fixing devices used on wooden sleepers, uses standard machines employed for installation and maintenance of sleepers and, due to its manufacture material, enables one to recycle the product at the end of the useful life of the sleeper.

Structurally, the proposed railroad sleeper comprises a hollow sector (bored-through sector), which acts as an important differential for the function and characteristic of anchoring on the ballast. Due to its proposed shape, the ballast used on the railroad will penetrate the sleeper, thus becoming an integral body.

With the compaction of the ballast inside the sleeper, greater rigidity for the ballast/sleeper system will be generated and the final inertia moment will be the sum of the inertia moment of the sleeper and the ballast layer arranged inside it.

Additionally, due to the proposed shape of the railroad sleeper, one has a light sleeper (ranging from 40 to 45 kg), easy to install and maintain, easy to be carried by two workers, and suitable for being transported by engaging one piece to another (one sleeper to another), thus brining numberless logistic advantages.

OBJECTIVES OF THE INVENTION

The present invention has the objective of developing a high-performance railroad sleeper for use in railroad lines under construction or operation, used for transporting loads and/or passengers.

An additional objective of the present invention is to provide a railroad sleeper whose installation and production processes are simplified, reducing working times, meeting the demand of the Market and guaranteeing efficiency in the cycle of use of the piece.

The present invention has also the objective of overcoming (in the most part) the main problems of present solutions (described in the prior art), such as high rigidity and weight of the concrete, which damage the ballast layers, short useful life of the poor-quality wood, and the electric conductivity of the steel, as well as the problem of reliability of the solutions that use recycled resins.

Further, the present invention has the objective of providing a railroad sleeper of sustainable appeal, which preferably uses polypropylene as a raw material and can be recycled at the end of its useful life.

The present invention has the additional objective of providing a railroad sleeper provided with a hollow sector, thus enabling the ballast of the railroad network to penetrate into the sleeper and potentiate the rigidity of the ballast/sleeper system.

It is also one of the objectives of the present invention to provide a structural configuration of a railroad sleeper provided with an inverted-U shape.

An additional objective of the present invention is to provide a railroad sleeper made from a first material and from a composition comprising said first material.

A further objective of the present invention is to provide a railroad sleeper, the inner and outer walls of which are made from a first material, and the layer arranged between such walls is made from a composition comprising the first material.

The present invention has also the objective of providing a railroad sleeper made by an extrusion/co-extrusion process.

An additional objective of the present invention is to provide a railroad sleeper whose hollow sector comprises a support groove.

An additional objective of the present invention is to provide a process for manufacturing a railroad sleeper by an extrusion process that enables compaction of the composition used in making the sleeper within the calibrator of the extruding machine, as well as homogeneous cooling of the whole thickness of the sleeper that is being produced.

Finally, the present invention has the objective of meeting, on a large scale, the Brazilian Market with good quality and reliability.

BRIEF DESCRIPTION OF THE INVENTION

The objectives of the present invention are achieved by means of a high-performance railroad sleeper, produced preferably from polypropylene with high fiberglass contents, which may range from 5 to 40%, manufactured preferably by an extrusion process with a layer of pure polypropylene as an envelope applied by the co-extrusion process.

The proposed railroad sleeper exhibits high elastic module and performance close to that of wood, thus enabling application on railroads for transporting load and passengers. The railroad sleeper proposed in the present invention has the following main advantages:
- availability and reliability of the raw material to meet the Market on a large scale;
- good electric insulator;
- high elastic module;
- totally recyclable;
- installation and maintenance equal to those of wooden sleepers, employing the same tools and equipment;
- greater ease of transportation and maintenance, reducing logistic costs;
- it is inert and impermeable;
- it can be used in conjunction with the wooden sleeper;

it enables the use of the fixation systems employed at present on wooden sleepers;

it enables the production of different lengths and shapes of sleeper to meet different gages and AMV's (line shift apparatus);

BRIEF DESCRIPTION OF THE DRAWINGS

The present invention will now be described in greater detail with reference to an example of embodiment represented in the drawings. The figures show:

FIG. 1 is a top representation of a railroad network suitable for receiving the railroad sleeper proposed in the present invention, wherein FIG. 1(a) represents a simple railroad network and FIG. 1(b) represents a railroad network of multiple rails;

FIG. 4 is a representation of the cross section of an additional embodiment proposed for the railroad sleeper;

FIG. 12 is a representation of an additional embodiment proposed for the railroad sleeper of the present invention, this embodiment comprising a contact surface protruding beyond the anchorage walls and further disclosing double support points, wherein FIG. 12(a) further discloses a support groove, FIG. 12(b) discloses double support points, FIG. 12(c) discloses a plurality of support grooves, and FIG. 12(d) discloses a plurality of anchorage teeth;

FIG. 13 is a representation of an additional embodiment proposed for the railroad sleeper of the present invention, this embodiment illustrating the embodiment in which the contact surface does not protrude beyond the anchorage walls and further comprising double support point that protrude into the hollow sector, wherein FIG. 13(a) further discloses a support groove, FIG. 13(b) discloses double support points that protrude into the hollow sector, 13(c) discloses a plurality of support grooves, and FIG. 13(d) discloses a plurality of anchorage teeth;

FIG. 17(d) illustrates a plurality of anchorage teeth.

FIG. 21 illustrated additional embodiments for the fixation blocks to be used in conjunction with the railroad sleeper proposed in the present invention; and FIG. 22 illustrated the fixation of the railroad sleeper proposed in the present invention by means of metallic plates, wherein FIG. 21(a) illustrates the use of a smaller metallic plate as compared to the metallic plate illustrated in FIG. 21(b).

FIG. 23 illustrated the fixation of the railroad sleeper shown in FIG. 19 by means of metallic plates, wherein FIG. 23(a) 23(b) illustrates segmented plates.

DETAILED DESCRIPTION OF THE FIGURES

Figure 2:
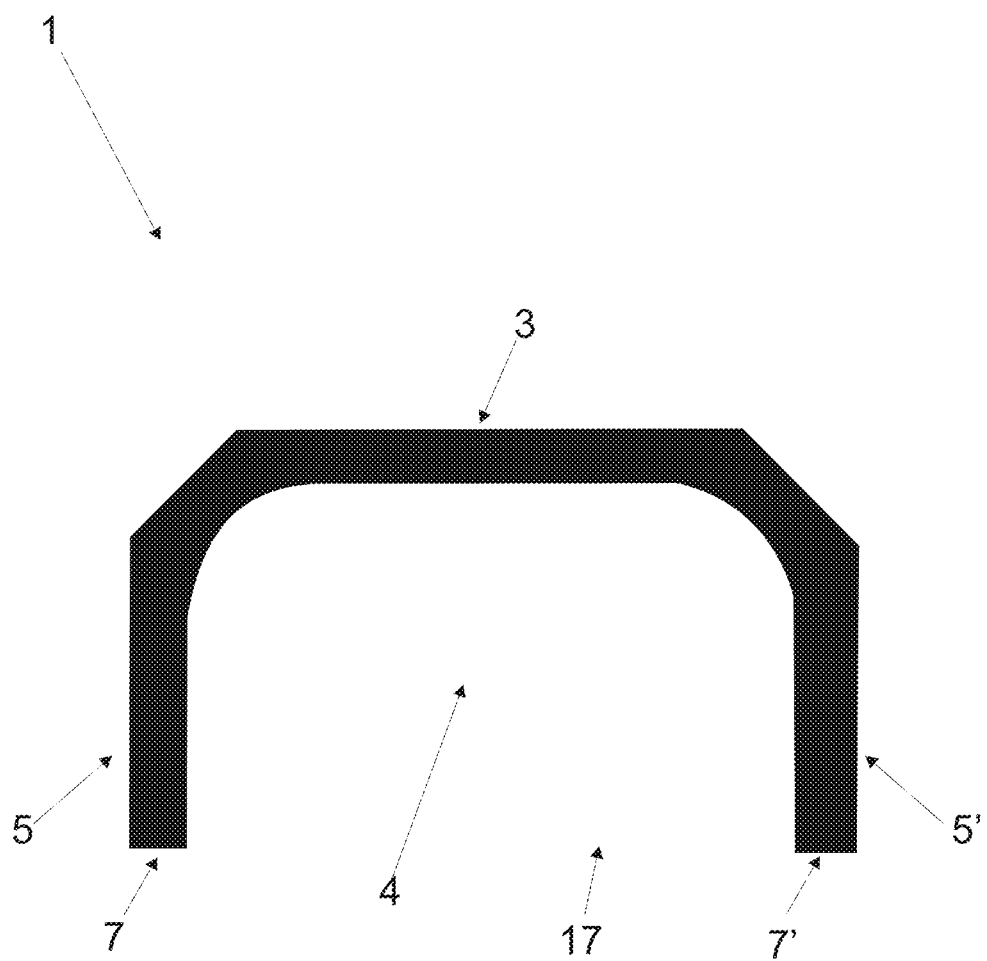
FIG. 2 is a representation of the cross section of an embodiment proposed for the railroad sleeper.

The present invention relates to a railroad sleeper 1 (called also sleeper 1).

Structurally and with reference to FIGS. 1 to 16, the sleeper 1 proposed in the present invention comprises a hollow sector 4, thus enabling the ballast used in the railroad network to penetrate and be compacted into the sleeper 1, thus increasing the rigidity of the sleeper/ballast assembly.

FIGS. 1 to 16 illustrate preferred structural embodiments proposed for the railroad sleeper 1, all of them maintaining the characteristic referring to the shaping of the hollow sector 4, as well as to the material (composite) used. The particularities of each embodiment will be discussed hereinafter.

In reference to FIG. 1, the sleeper 1 proposed is used for fixing at least one pair of rails 2,2' of a railroad. It should be mentioned that the sleeper 1 is suitable for use in simple railroad networks, provided with only one pair of rails 2, 2', as shown in FIG. 1(a), or still it may be used at point of the railroad network that comprise a number of rails as shown in 1(b).

FIG. 1 further makes reference to a contact surface 3 of the proposed sleeper 1, said surface 3 being configured preferably as a plane surface for arrangement of each rail 2, 2' of the railroad network.

FIG. 2 illustrates a cross-sectional view of a first structural embodiment of the railroad sleeper illustrated in FIG. 1. One notes the contact surface 3, preferably plane, from which anchorage walls 5 and 5' protrudes, thus delimiting the hollow sector 4 mentioned before.

More specifically and with reference to FIG. 2, the hollow sector 4 is delimited from the contact surface 3 and by means of Anchorage walls 5, 5'. Thus, a free portion adjacent to the anchorage walls 5, 5' is established, opposite the contact surface 3. In other words, the embodiment proposed for the railroad sleeper 1 establishes an inverted-U shape.

Thus, the free portion 17 should be understood as a (face) bored-through (opened) portion of the hollow sector 4, this portion enabling the ballast of the railroad network to penetrate the railroad sleeper 1, and more specifically of the hollow sector 4.

The lower portion of the anchorage walls 5, 5', that is, the portion that supports the sleeper 1 on the soil, is called support points 7, 7', such support points 7, 7' being opposite the points of association between the contact surface 3 and the anchorage walls 5, 5'.

Figure 3:
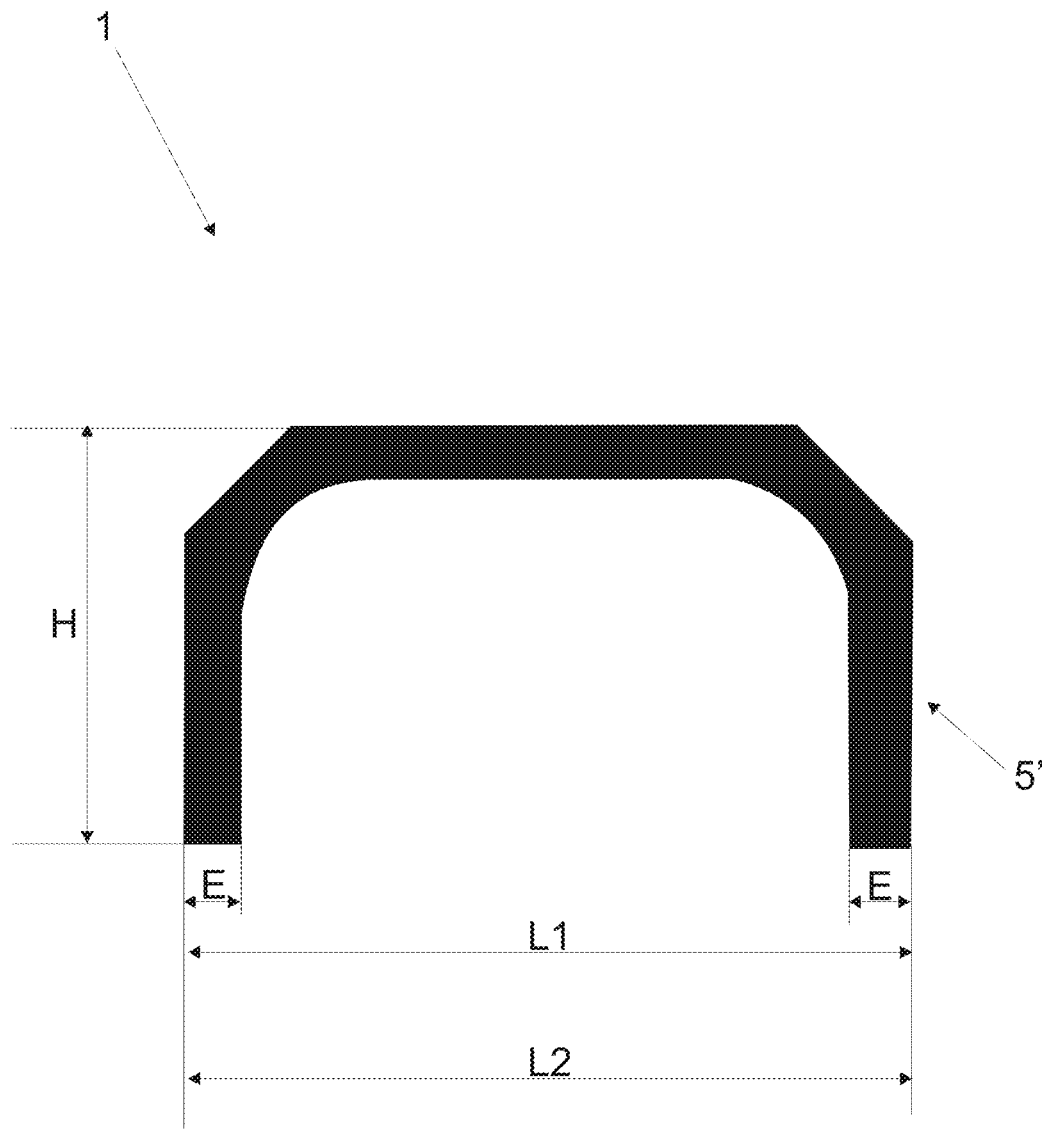
FIG. 3 is an additional representation of the cross section of an embodiment proposed for the railroad sleeper, showing its preferred dimensions.

With reference to FIGS. 3 and 4, the anchorage walls 5, 5' delimit a first width $L_1$ of the railroad sleeper 1 proposed. As shown in FIG. 3, and considering a preferred thickness E for the sleeper 1, the first width $L_1$ is delimited by the outermost portions (outer walls) of the anchorage walls 5,5', that is, the portions that are not adjacent to the hollow sector 4.

With regard to the support points, they may assume different structural embodiment for the proposed sleeper 1, as shown in FIGS. 2 to 4.

The embodiment shown in FIGS. 2 and 3 is referred to as simple support points 7, 7', wherein the contact thickness of the sleeper 1 with the ground is configured as the thickness E itself of the sleeper 1.

On the other hand, the embodiment shown in FIG. 4 and more specifically in FIG. 4(a) presents double support points 8, 8', wherein the contact thickness of the sleeper 1 with the ground exhibits dimensions larger than the thickness E of the sleeper 1.

More specifically, the distance between the support points 7, 7' shown in FIG. 3 and the support points 8, 8' shown in FIG. 4 (FIG. 4(b)) define a second width $L_2$ of the railroad sleeper. Thus, in the embodiment in which the simple support points 7, 7' are used, the first width L1 has dimensions equal to those of the second width $L_2$, as shown in FIG. 3.

On the other hand, in the embodiment in which the double support points 8, 8' are used, the first width $L_1$ is smaller than the second width $L_2$, as shown in FIG. 4, more specifically in FIG. 4(b).

Figure 5:
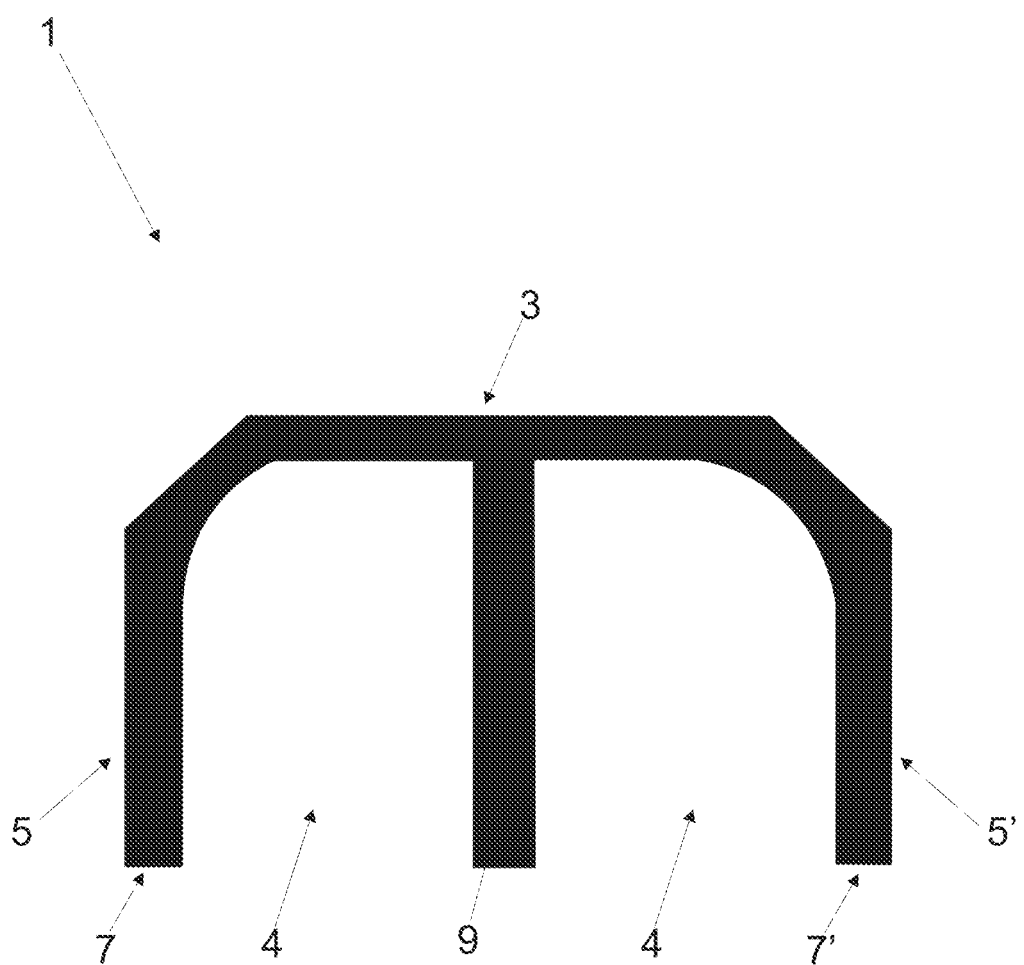
FIG. 5 is a representation of the cross section of an additional embodiment proposed for the railroad sleeper.

FIG. 5 illustrate a third embodiment valid for the proposed sleeper 1. In this embodiment, one observes the elements discussed before in the previous embodiments, such as contact surface 3 and anchorage walls 5, 5'.

Figure 6:
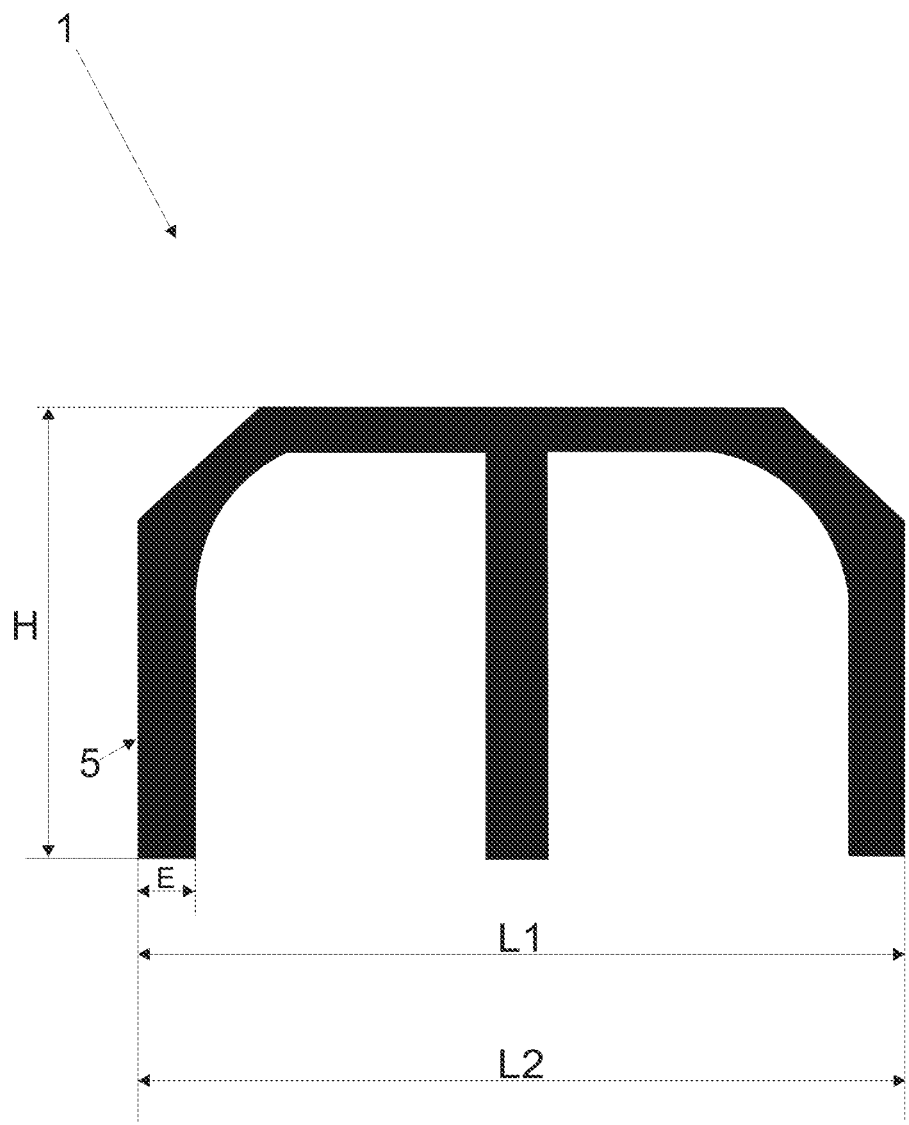
FIG. 6 is a representation of the cross section of the structural embodiment proposed for the railroad sleeper shown in FIG. 5, illustrating its preferred configurations.

The proposal shown in FIG. 5 makes use of simple support points 7, 7', thus establishing equal dimensions for the first and second widths $L_1$ and $L_2$, respectively (as shown in FIG. 6).

With a view to potentiate the support of the railroad sleeper 1 proposed in the present invention, there is also, in the embodiment shown in FIGS. 5 and 6, a groove 9 protruding from the contact surface 3 and toward the hollow sector 4 of the railroad sector 4 of the railroad sleeper 1.

Figure 7:
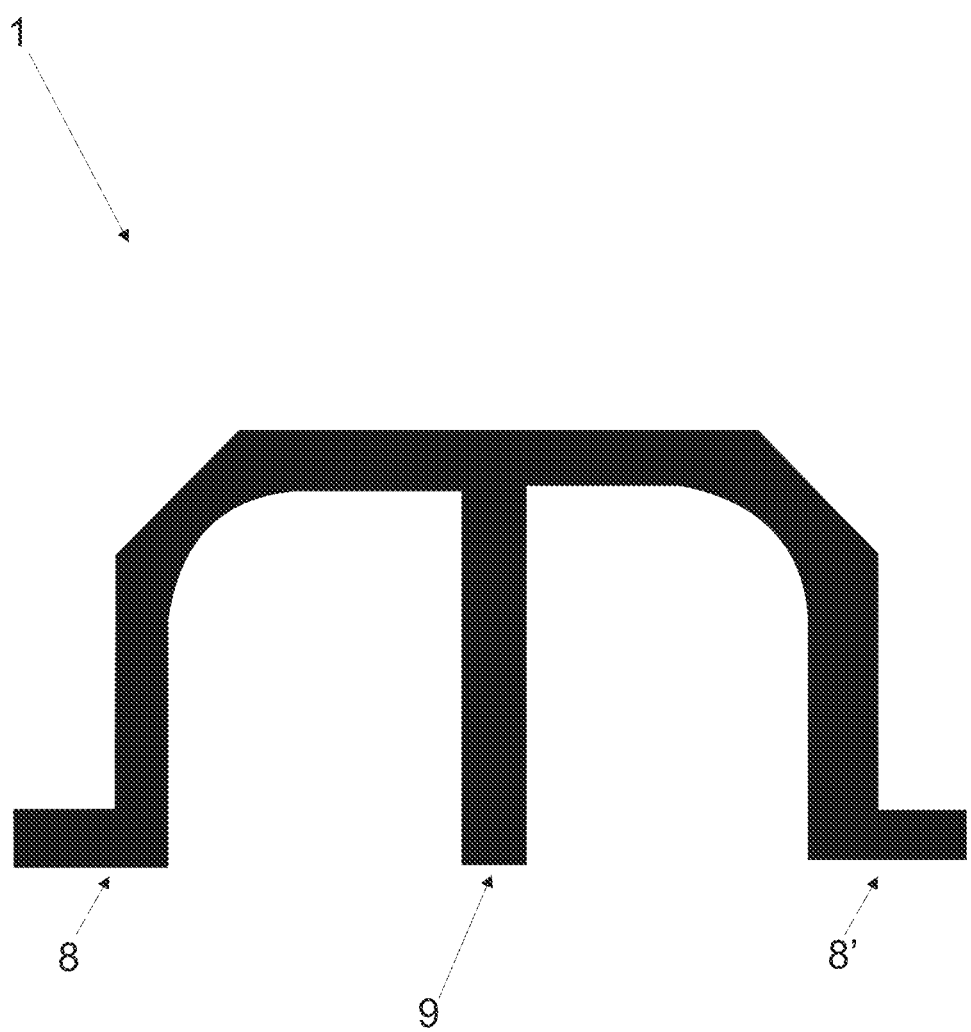
FIG. 7 is a representation of the cross section of an additional embodiment of the railroad sleeper proposed in the present invention.
Figure 8:
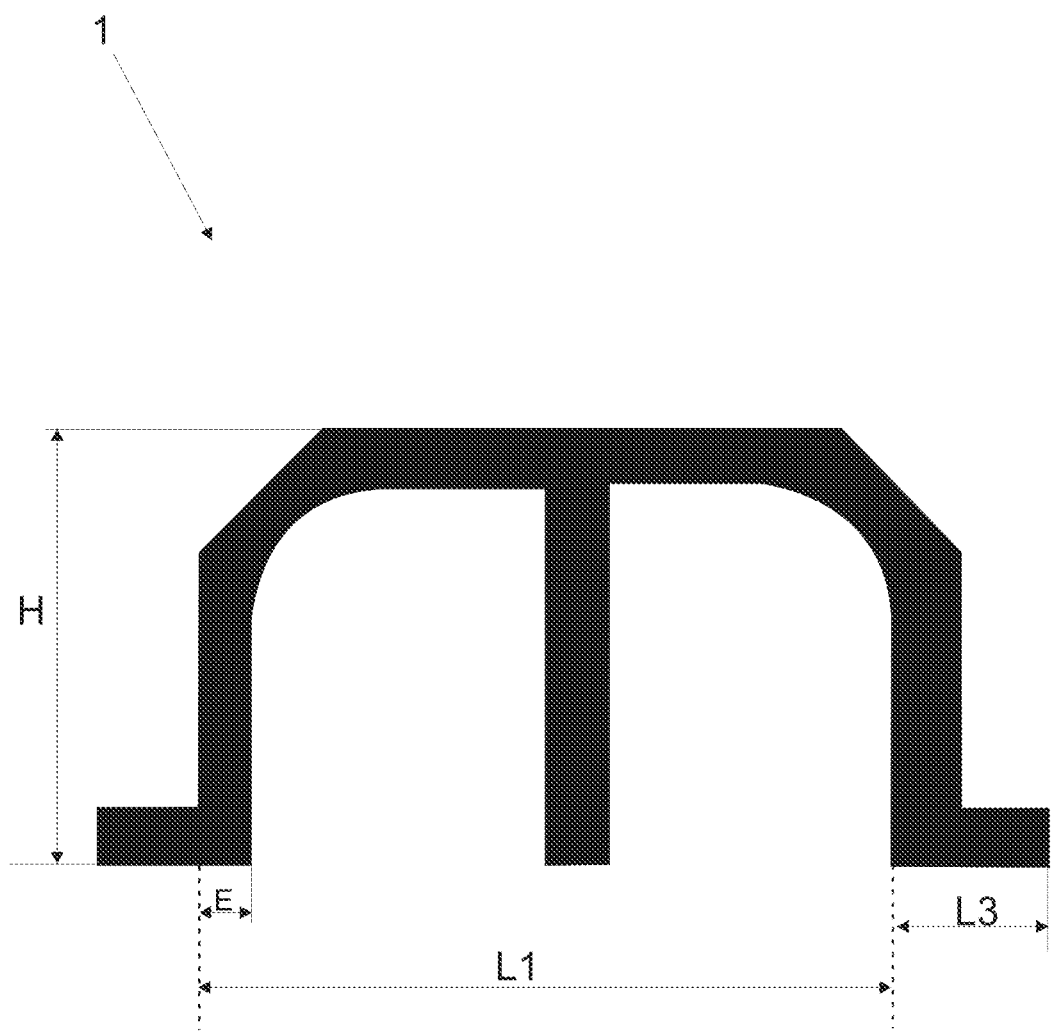
FIG. 8 is an additional representation of the cross section of the railroad sleeper shown in FIG. 7, illustrating its preferred.

FIG. 7 illustrates an additional structural embodiment for the railroad sleeper 2 proposed, this embodiment making use of the support grooves 9 and of the double support points 8, 8'.

Figure 9:
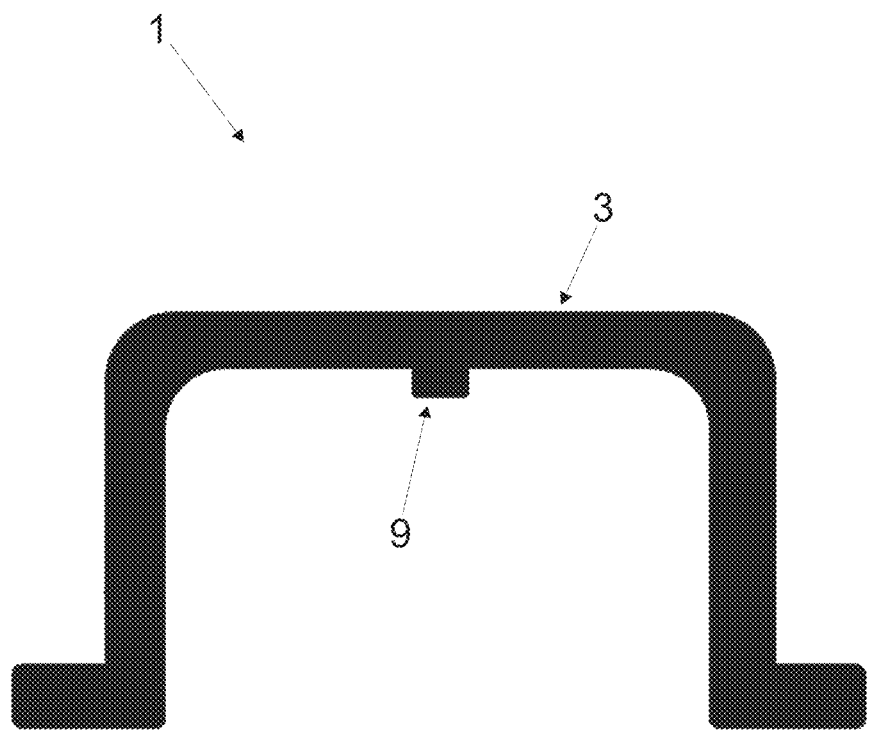
FIG. 9 is a representation of an additional embodiment proposed for the railroad sleeper proposed in the present invention, this embodiment comprising a support groove.

The support groove 9 may protrude through the whole height of the hollow sector 4, as illustrated in the embodiments shown in FIGS. 6 and 7, or, alternatively, the later may protrudes freely from the support base 3 and toward the hollow sector 4, as shown in FIG. 9.

In an additional structural configure, the support grooves 9 further protrudes from at least one of the anchorage walls 5, 5' and toward the hollow sector 4 of the railroad sleeper 1.

Figure 10:
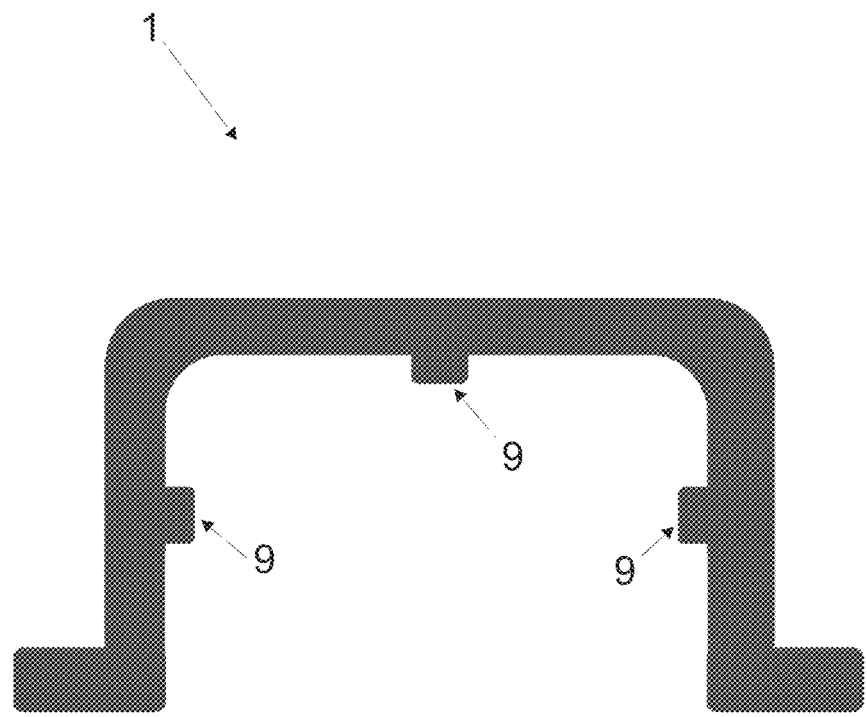
FIG. 10 is a representation of an additional embodiment proposed for the railroad sleeper proposed in the present invention, this embodiment comprising a plurality of support grooves.

Such an embodiment is shown in FIG. 10, where one observes that this proposal comprises a support groove 9 protruding from the contact surface 3 and a support groove protruding from the anchorage walls 5 and 5'.

An alternative structural embodiment for the railroad sleeper comprises the support grooves 9 protruding from only the anchorage walls 5, 5', or still protruding from only one of the Anchorage walls 5, 5'. Further, the number of support grooves 9 shown in the figures should not be considered a limitative characteristic of the present invention.

The proposed railroad sleeper 1 further comprises a plurality of anchorage teeth 12, such anchorage teeth 12 being preferably arranged on at least one of the anchorage walls 5, 5'.

More specifically, the Anchorage teeth 12 are arranged in the portion of the anchorage walls 5, 5' not adjacent the hollow sector 4, or still, for a better understanding, the anchorage teeth 12 are arranged on the outer walls of the anchorage walls 5, 5'.

Figure 11:
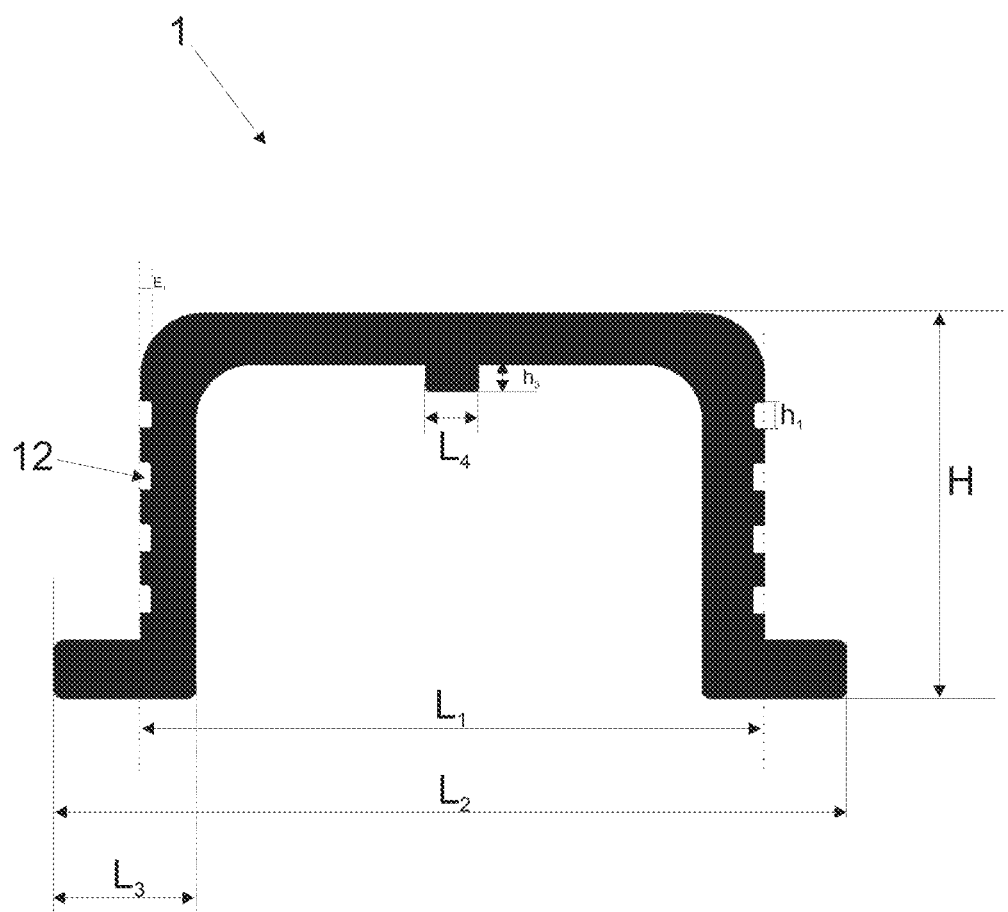
FIG. 11 is a representation of an additional embodiment proposed for the railroad sleeper proposed in the present invention, this embodiment comprising a plurality of Anchorage teeth.
Figure 14:
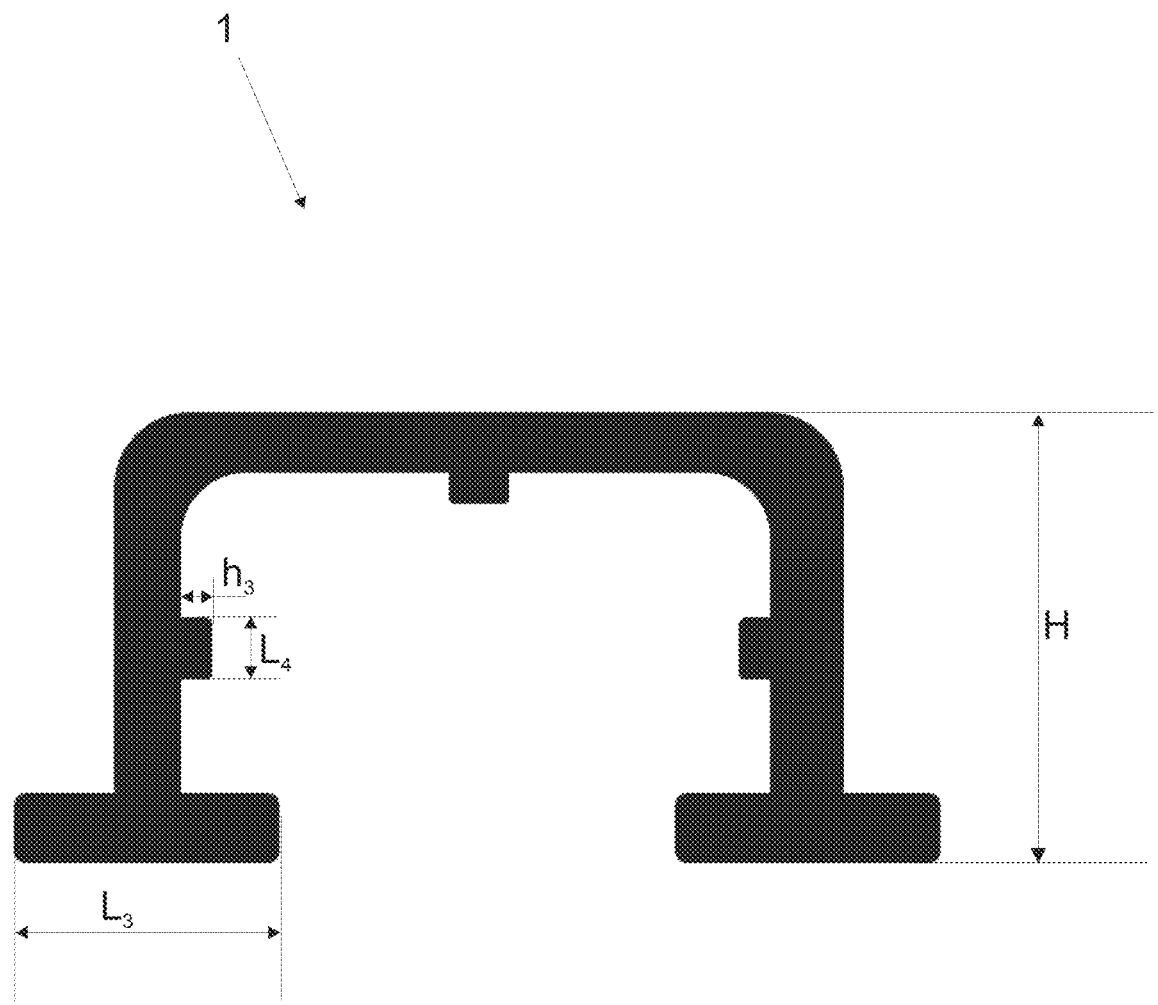
FIG. 14 is a representation of the cross section of the structural embodiment proposed for the sleeper illustrated in FIG. 13(c), highlighting its preferred dimensions.

As can be seen in FIG. 11, the anchorage teeth 12 are configured as recesses (channels) that preferably travel the whole length of the sleeper.

The anchorage teeth 12 do not interfere in the mechanical characteristics of the sleeper 1, more specifically such teeth 12 provide greater Anchorage of the sleeper 1 to the ballast, enabling the ballast to penetrate into each of the anchorage teeth 12. Additionally, the arrangement of the anchorage teeth 12 further provides saving of material and optimization in the manufacture of the sleeper 1.

In alternative embodiments, the railroad sleeper 1 might be configured so that the contact surface 3 would protrude beyond the anchorage walls 5, 5', as shown in FIG. 12 of the present invention.

It is noted that such embodiments make use of double support points 8, 8', wherein 12(a) illustrates the sleeper 1 comprising a support groove 9 protruding from the contact surface 3 and toward the hollow sector 4. On the other hand FIG. 12(b) illustrates the sleeper without any support groove 9 in its hollow sector 4.

FIG. 12(c) illustrates the sleeper 1 provided with support grooves 9 from the contact surface 3 and also from the Anchorage walls 5, 5', and, finally, FIG. 12(d) illustrates the sleeper 1 provided with a support groove 9 from the contact surface 3 and also provided with Anchorage teeth 12.

In the embodiments in which the railroad sleeper 1 comprises double support points 8, 8', such points 8, 8' may protrude out of the hollow sector 4 (as shown in FIG. 12), or alternatively such support points 8, 8' may protrude both out of the hollow sector 4 and into it, as shown in FIG. 13. In another alternative embodiment, the support points 8, 8' might protrude only into the hollow sector 4. In this case, the second width $L_2$ of the sleeper would assume a dimension equal to the first width $L_1$.

The embodiments shown in FIG. 13 are similar to those of FIG. 12 with respect to the arrangement of the anchorage grooves 9. One just observes that in FIG. 13 the contact surface 3 does not protrude beyond the anchorage walls 5, 5'.

The structural embodiments proposed for the railroad sleeper 1 having been presented, their preferred embodiments are discussed hereinafter.

The thickness E of the sleeper 1 preferably assumes the value of 2 centimeters (cm), so that values ranging from 1 to 4 centimeters would be acceptable. In the embodiments where the sleeper 1 comprises anchorage teeth 12, such teeth comprise a thickness $E_1$ ranging from 0.2 to 0.5 cm.

Thus, and with specific reference to FIG. 11, each of the anchorage teeth 12 is provided with a thickness $E_1$ (thickness of the Anchorage teeth E1) that preferably range from 0.2 cm to 0.5 cm.

Further with reference to FIG. 11, the height $h_1$ of each anchorage tooth 12 assumes preferable values from 0.5 to 2.0 cm.

For any of the embodiments proposed for the railroad sleeper 1, the first width $L_1$ preferably is equivalent to 24 cm, so that values in the range 18 to 30 cm would be acceptable.

The embodiments that make use of double support points 8, 8' (protruding both into and out of the hollow sector 4) establish a second preferred width L2 of 32 cm, so that values in the range 19 to 48 cm would be acceptable, provided that obviously the second width $L_2$ (double support points) is larger than the first width $L_1$ (simple support points).

In the embodiment in which the double support points 8, 8' protrude only into the hollow sector 4, the second width L2 will assume a value equal to the first width $L_1$.

With regard to the width of the double support points 8, 8', referred to as third width $L_3$ (FIGS. 4, 8, 11 and 14), the later preferably is equivalent to 6 cm (FIGS. 4, 8 and 11), so that values in the range from 1.5 to 12 cm would be acceptable. In the case of the embodiment shown in FIG. 14, there is a preferred third width $L_3$ of 10 cm, wherein the range of 2 to 20 cm is acceptable.

As to the height of the railroad sleeper 1 proposed in the present invention, it is referred to as a first height H and preferably is equivalent, for any of the embodiments proposed, to 19 cm, so that values in the range from 14 to 20 cm would be acceptable.

In the embodiments that make use of the support groove 9, such an element protrudes from the contact surface 3 at values in the range from 0.5 to 19 cm, thus establishing a height of the Anchorage groove $h_3$, as shown in FIG. 1. Obviously, the upper limit of this range represents the embodiment in which such a groove extends along the whole height of the hollow sector 4 (FIGS. 5 and 6).

The width of the anchorage groove, referred to as $L_4$, assumes preferred values from 0.5 to 3.0 cm.

For support grooves 9 protruding from the anchorage walls 5, 5', one should reduce the maximum limit of the height $h_3$ to the value used in the thickness E of the railroad sleeper 1.

Figure 15:
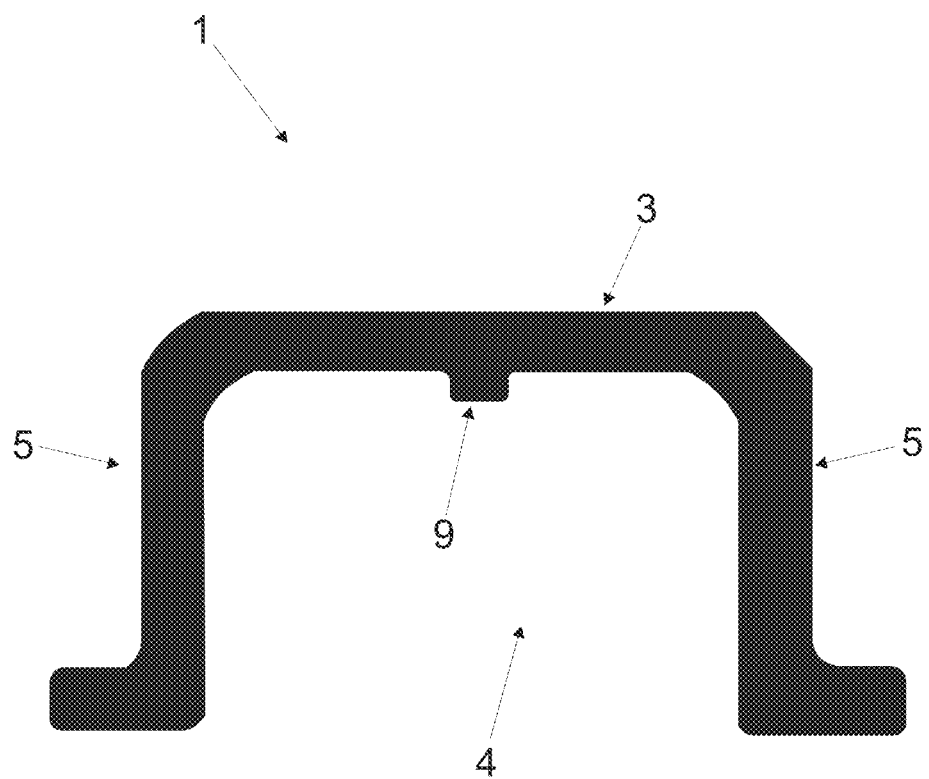
FIG. 15 is an additional representation of the cross section of a structural embodiment proposed for the railroad.

The association of the anchorage walls 5, 5' with the contact surface 3 and the double support points 8, 8' may be carried out orthogonally, as shown in previous figures, alternatively it may be carried out by segments in curvature, as in the embodiment shown in FIG. 15.

The same thing occurs for the embodiment of the support groove 9, which is suitable to be arranged orthogonally with respect to the contact surface 3 and anchorage walls 5, 5', or alternatively it may be configured from segments in curvature.

In order for the sleeper 1 to be capable of standing the stresses of its application field, there is the need to use a material having a high elastic module (high rigidity), having also high resistance to impact, resistance to fatigue and high market availability.

More specifically and in a preferred manner only, the inner wall 13 and an outer wall 14 of the sleeper 1 are manufactured from the first material, preferably a polymeric material and more preferably a pure polymeric material.

Figure 16:
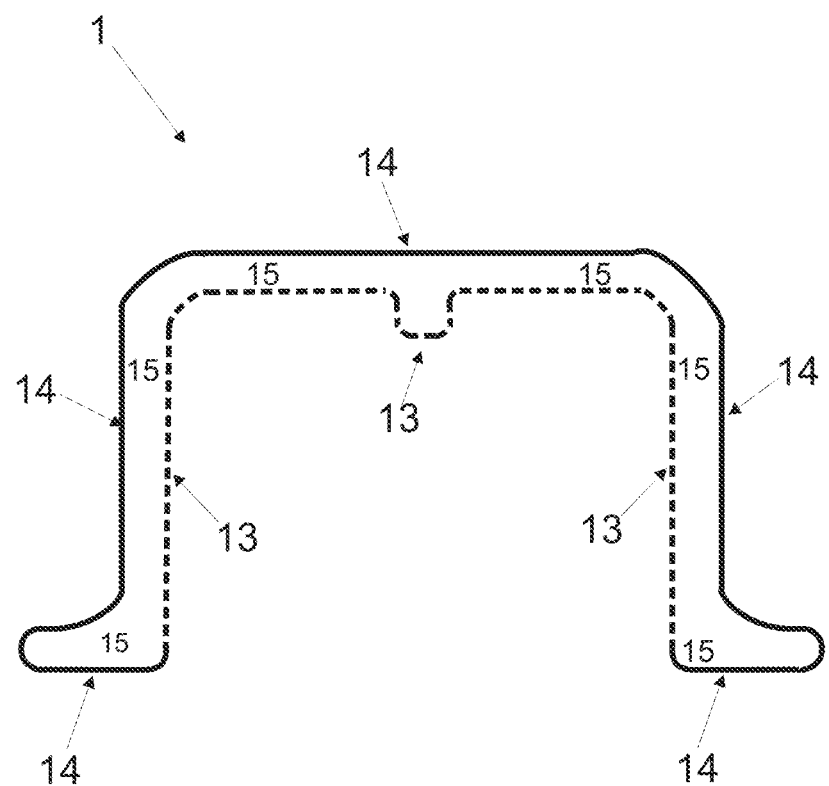
FIG. 16 is a representation of the cross section of a structural embodiment proposed for the railroad sleeper, highlighting its inner and outer walls, and an intermediate layer.

The inner and outer walls 13, 14 are delimited by the contact surface 3 and anchorage walls 5, 5', as better shown in FIG. 16.

In FIG. 16, the outer wall 14 is represented by solid line. On the other hand, the inner wall 13 of the railroad sleeper 1 is referenced by dashed line.

On the other hand, the inner portion of the walls 13 and 14, referred to as an intermediate layer 15, is preferably made from a composition that preferably, but not exclusively comprises the first material, more preferably a composition of polypropylene with fiberglass, and still more preferably a composition of polypropylene with a fiberglass mass preferably between 5% and 40% (by mass) and, even more preferably from 33% to 37% by mass of fiberglass.

It should be mentioned that the manufacture of the inner wall 13 and the outer wall 14 from the same material used in the manufacture of the intermediate layer 15 (in this case, polypropylene) is just a preferred characteristic of the present invention. Thus, the walls 13 and 14 might be manufactured from a material other than that used in layer 15, as long as obviously it provides the necessary adherence to the piece.

Such a preferred characteristic in the material of the proposed sleeper 1, wherein the inner 13 and outer 14 walls are preferably made from polypropylene and the intermediate layer 15 is made from a composition of polypropylene with fiberglass, is valid for all the structural embodiments proposed for the railroad sleeper 1, and not only for the embodiment shown in FIG. 16.

The thickness of one of the inner walls and outer walls 13 and 4 preferably ranges from 0.005 to 0.05 cm, while the thickness of the inner layer 15 may be achieved by subtracting the thickness E of the railroad sleeper by the value of the thickness of one of the inner 13 and outer 14 walls.

It is important to point out that the use of the composition of polypropylene with fiberglass in the intermediate layer 15 should be considered just a preferred characteristic of the present invention, so that any material (composition) having bending module higher than or equal to 5000 MPa might be used. Finally, one should understand that the bending module should be measured (determined) according to the Rule ISO 178.

For fixation of the proposed sleeper 1 to the rails 2, 2', fixation blocks 10 should be arranged in the hollow sector 4 of the sleeper 1. These blocks have the primary function of enabling the installation of the tirefonds and installation of the fixing devices that fasten the rails 2, 2' to the sleeper. More specifically, such blocks 10 prevent lateral movements of the railroad and should be arranged in the portion of the sleeper 1 that is below the rails 2, 2', or, in other words, in the portion of the sleeper 1 opposite the point of arrangement of the tracks on the contact surface 3.

Figure 18:
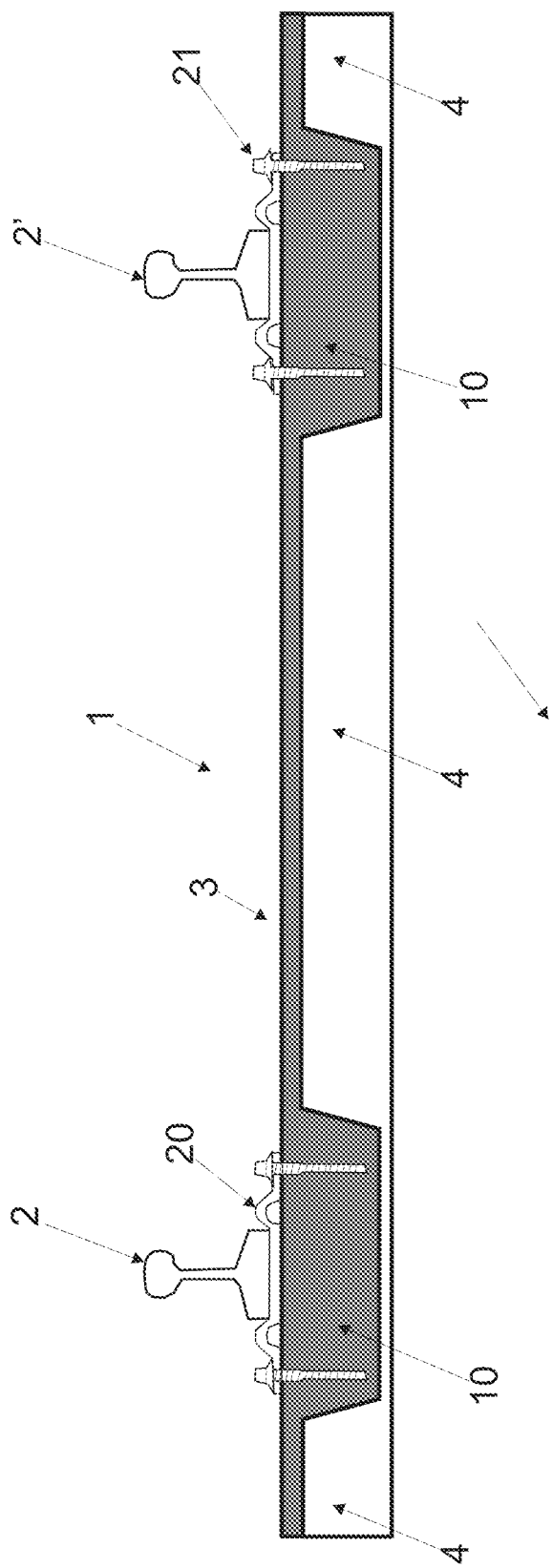
FIG. 18 is a profile representation of a railroad network comprising the railroad sleeper proposed in the present invention, further illustrating the fixation blocks.

FIG. 18 illustrates a profile view of a railroad network in which the sleeper 1 proposed in the present invention is used. In this figure, one observes the sleeper 1, each of the rails 2, 2' fixed to the contact surface 3 by means of the support plates 20 and tirefonds 21.

One further observes in the hollow sector 4 of the sleeper 1, which, when fixed to a railroad network, enables the ballast of the railroad to penetrate the hollow sector 4 and, with the compaction of the ballast in the hollow sector 4, greater rigidity of the ballast/sleeper system will be achieved.

One further notes in FIG. 18 the fixing blocks 10 arranged below each of the rails 2, 2', such blocks 10 being configured as solid blocks and may be made from wood, recycled material, concrete, polyethylene, polypropylene, and still may be made from the same material used in the manufacture of the sleeper 1, a composition of polypropylene with fiberglass. In the preferred embodiment, the fixing blocks 10 are made from polyethylene.

Such fixing blocks 10 may be manufactured by different processes, such as extrusion, intrusion, injection and machining processes that use massive blocks to obtain the final shape of the piece.

Figure 19:
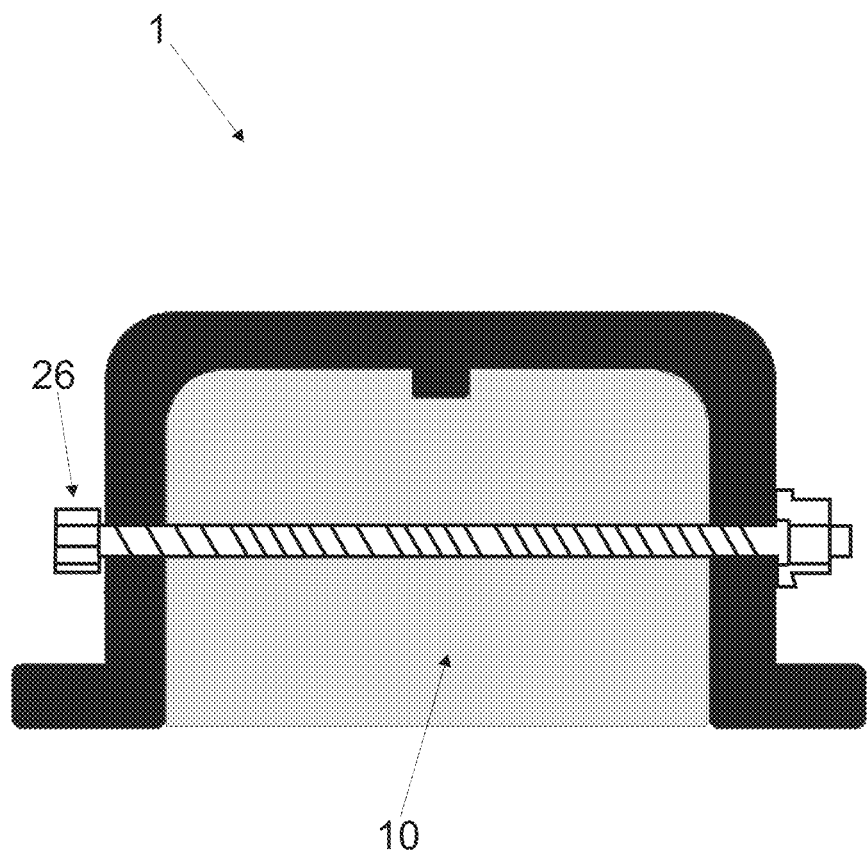
FIG. 19 is a representation of the fixation of the railroad sleeper to a fixation block and further making use of a fixation element arranged transversely on the sleeper.
Figure 20:
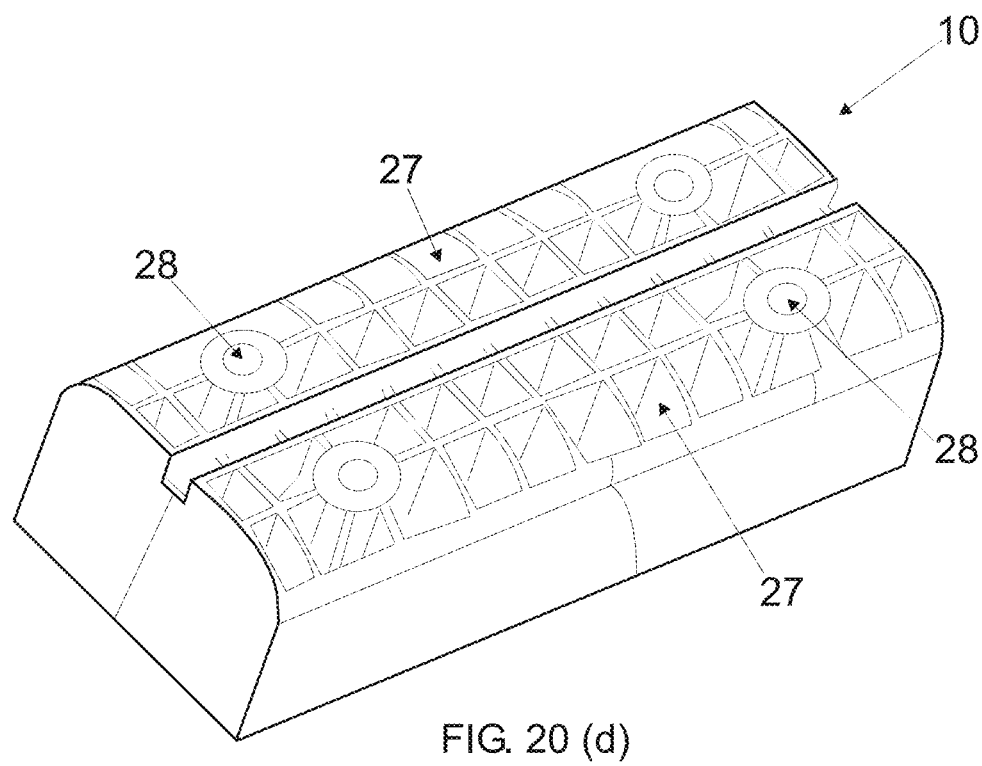
FIG. 20 illustrates possible structural embodiments for the fixation blocks to be used in conjunction with the railroad sleeper proposed in the present invention.
Figure 20:
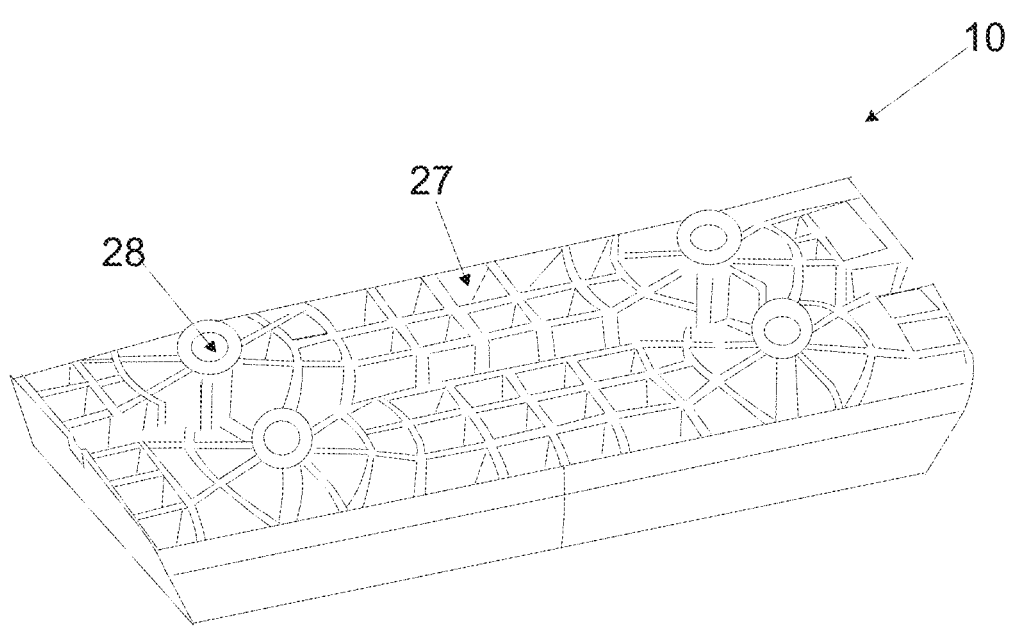

For better fixation of the blocks 10 to the sleeper 1, fixing elements, preferably configured as hexagonal screws 26 might be arranged transversely to the sleeper 1, as preferably represented in FIG. 19. FIGS. 20 and 21 illustrate shapes proposed for the fixing blocks 10. It is important to mention that the structural embodiments proposed for the railroad sleeper 1 enable use of any of the embodiments of the fixing blocks 10.

The preferred dimensions of each of the proposed fixing blocks 10 are described as follows:

With reference to FIG. 20(*a*), it preferably represents a larger base in 60 cm, so that values ranging from 50 to 80 cm would be acceptable.

The smaller base has a preferred value of about 40 cm, the preferred height is of 15 cm, so that values in the range 13 to 17 cm would be acceptable, and the preferred depth is equivalent to 20 cm, for both the height and the width.

The preferred values for the fixing block illustrated in FIG. 20(*v*) are of 15×13×20 (width×height×depth), while for the embodiment shown in FIG. 20(*c*) there are preferred values of 7.5 cm for the smaller base and 15 cm for the larger base, the preferred depth being of 20 cm and the preferred height being equivalent to 13 cm.

The proposal illustrated in FIGS. 20(*d*) and 20(*e*) disclose fixing blocks 10 made by injection process. One notes that the blocks 10 illustrated in such figures comprise a number of structures 27 designed for supporting loads referring to the arrangement of railroad coaches.

Thus, the structures 27 combine resistance and lightness and establish a new possibility of arranging the fixing blocks 10. On further notes that the blocks 10 discloses in FIGS. 20(*d*) and (20(*e*) further comprises orifices 28 already designed for arrangement of appropriate screws. It should be pointed out that the arrangement and the shape of the structures 27 should not be limited to the embodiments shown in FIGS. 20(*d*) and 20(*e*).

Further, any of the fixing blocks 10 discussed in the present invention and disclosed in FIGS. 20(*a*), 20(*b*), 20(*c*), 21(*a*) and 21(*b*) might be made by an injection process, thus configuring a structured block (with the structures 27).

As to the dimensions of the fixing blocks represented in FIGS. 20(*d*) and 20(*e*), one may use preferably the same values already described for the fixing block 10 shown in FIG. 20(*a*).

The structural embodiment of the fixing block shown in FIG. 21(*a*) has larger base preferably at 60 cm, so that values in the range from 50 to 60 cm would be acceptable, its preferred height being of 15 cm, values between 13 and 17 cm being acceptable, preferred depth being of 20 cm, while the width of each of the bases adjacent the cavity 24 is preferably of 7.5 cm.

Finally, the proposal illustrated in FIG. 21(*b*) exhibits the same values for the larger base, height and depth as the values of the embodiment 21(*a*) and a preferred width of 15 cm for each of the smaller bases adjacent the cavity 24. One should mention that the above-mentioned dimensions were given by way of example, without entailing any limitation of the present invention.

Alternatively to the use of the fixing blocks 10, one may fixe the sleeper 1 by means of the already existing cast-iron plates 25 and still by means of the metallic plates 22 (preferably made of steel) fixed to the existing plates (plate 25) by means of conventional fixing element 23, such as screws, press washers and nuts.

Such fixing form is illustrated in FIG. 22, wherein FIG. 22(*a*) shows metallic plates 22 of smaller size as compared to that represented in FIG. 22(*b*). The embodiment shown in FIG. 22(*b*), being arranged completely between the rails of the railroad network, ends up increasing the strength of the sleeper 1. It is further pointed out that the number of metallic plates 22 used should not restrict the number shown in FIG. 22.

In addition to the structural embodiments proposes for the railroad sleeper 1, where one establishes the hollow sector 4 and its free portion 17, the present invention also proposes the shaping of a railroad sleeper 1' further comprising a support surface 3'.

Said support surface 3' is opposite the contact surface 3 and adjacent the Anchorage walls 5 and 5'. In this way, the hollow sector 4 of the railroad sleeper 1' is delimited from the association of the contact surface 3 with the support surface 3' and by means of the anchorage walls 5, 5'. Thus in the embodiments shown in FIG. 17, the sleeper 1' does not comprise the free portion 17, since its hollow sector 4 is delimited also by the support surface 3'.

Figure 17:
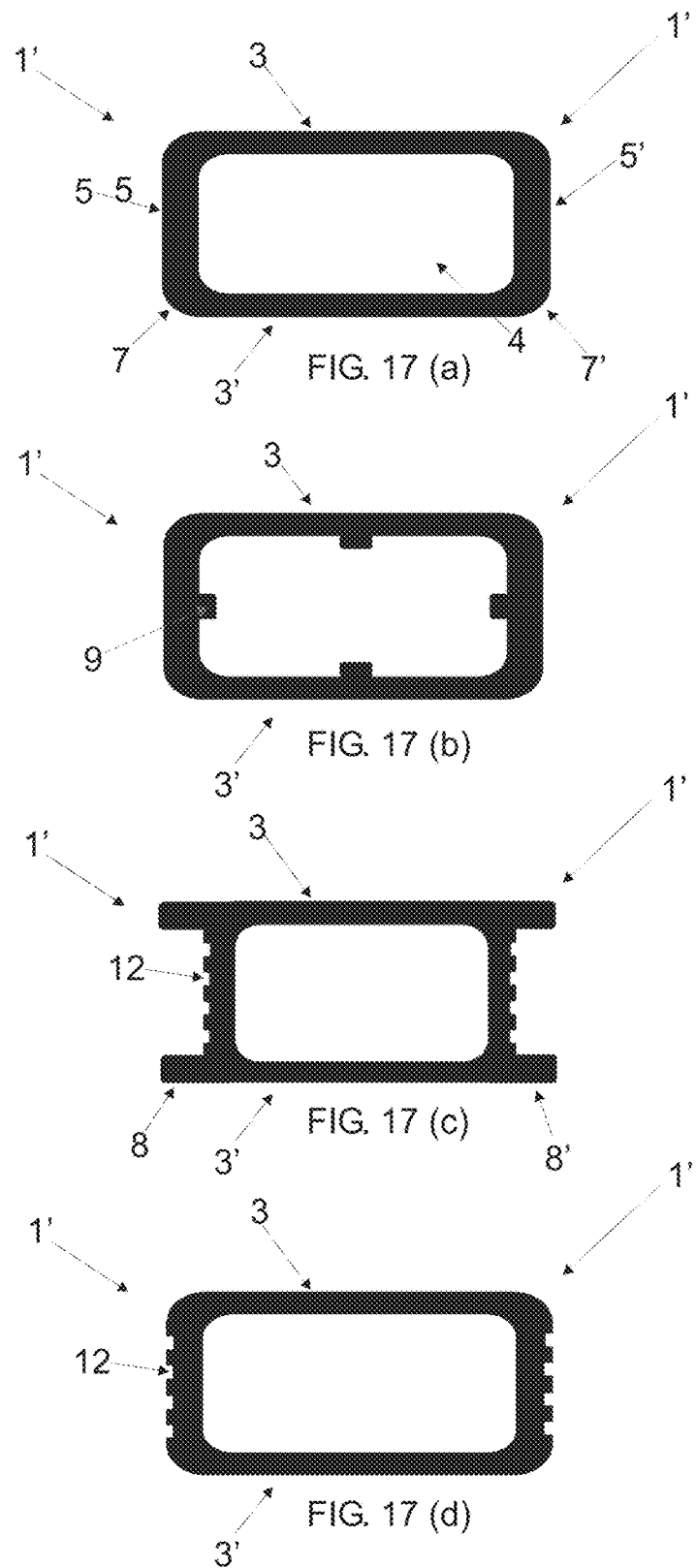
FIG. 17 is a representation of the cross section of an additional embodiment of the railroad sleeper proposed in the present invention, this embodiment further comprising the support surface illustrated in FIG. 17(a), FIG. 17(b) further illustrates a plurality of support grooves, FIG. 17(c) further illustrates a plurality of anchorage teeth, and the protrusion of the support and contact surfaces beyond the anchorage walls.

It should be pointed out that the other characteristics and embodiment proposed for the railroad sleeper 1 comprising the free portion 17 are also valid for the embodiment of the railroad sleeper 1' shown in FIG. 17 and that comprises the support surface 3'.

Figure 23:
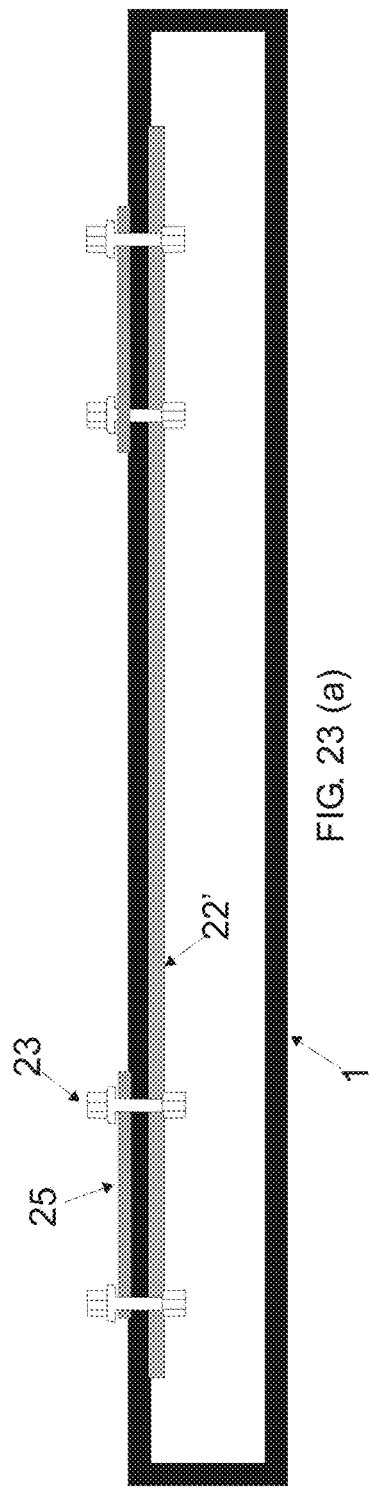
Figure 23:
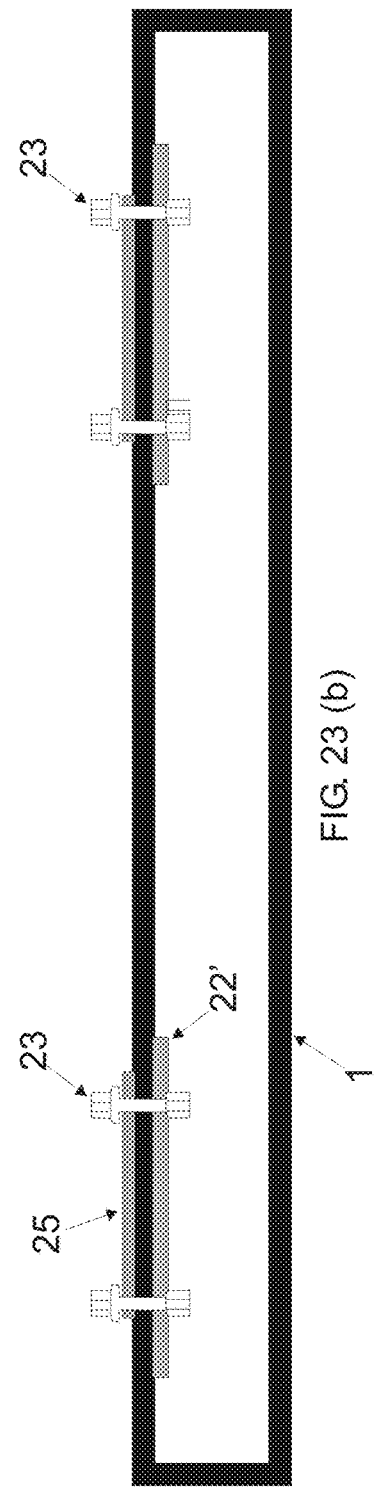

For example, in the railroad sleeper 1' provided with the support surface 3', is reference to the inner 13 and outer 14 walls is valid, as well as the use of the material and composition already mentioned when describing the railroad sleeper 1. Further, the reference to the use of the support blocks 10 is also valid for this embodiment. In this regard, FIG. 23 illustrates additional possibilities of fixing the railroad sleeper 1', wherein metallic plates 22' are used (the number of metallic plates 22' does not restrict the number represented in the figures). The comment already made in FIG. 22(*a*) about the increase in the strength of the sleeper 1 is also valid for the representation of FIG. 23(*a*).

Further, as one observes in the embodiment shown in FIG. 7(*b*), the railroad sleeper 1' comprises support grooves 9, which protrude from at least one of the contact surfaces 3, support surface 3' and Anchorage walls 5.5'.

Further, as observed in FIG. 17(*c*), the contact surface 3 may protrude beyond the Anchorage walls 5, 5', together with the support surface 3' proposed in this embodiment.

One observes in FIGS. 17(*c*) and 17(*d*) the proposal of arranging the Anchorage teeth 12, just as proposed before for the embodiment of the railroad sleeper 1 in which its hollow sector 4 does not comprise the support surface 3'.

In the embodiment shown in FIG. 17, the simple support points 7, 7' should be understood as the proposal in which the contact surface 3 and the support surface 3' do not protrude beyond the Anchorage walls 5, 5', as shown in FIGS. 17(*a*), 17(*b*) and 17(*d*).

On the other hand, the double support points 8, 8' should be understood as the proposal in which the contact surface 3 and the support surface 3' protrudes beyond the Anchorage walls 5, 5,' just as the embodiment proposed in FIG. 17(*c*).

In summary, except for the difference in the shaping of the hollow sector 4, the railroad sleeper 1' comprises all the characteristics mentioned before for the railroad sleeper 1.

It is important to mention that the embodiments illustrated in the figures of the present invention are preferred embodiments for the railroad 1,1'.

Thus, considering both the railroad sleeper 1 provided with a free portion 17 and the railroad sleeper 1' with the support surface 3', it is acceptable to propose an embodiment that is not explicitly shown in the figures presented, but that uses combinations of the characteristics set forth in the figures.

For example, considering the embodiment shown in FIG. 17, it would be acceptable to propose a structural embodiment for the railroad sleeper 1' that makes use of the Anchorage teeth 12 and of the support grooves 9, even if the figures do not explicitly illustrate such an embodiment.

The structural forms proposed for the railroad sleeper 1, 1' of the present invention are obtained preferably by an extrusion/co-extrusion process. Such a process is carried out by means of a conventional extruding machine, provided, for example, with a feed point, thread cannon, matrix, calibrator and velocity reducer.

The structural embodiment of the extruding machine do not represent the preferred aspect of the present invention, so that extruding machines known from the prior art may be used to shape the railroad sleeper 1, 1,' proposed.

On the other hand, determined parameters and extrusion-process steps should be followed for correct shaping of the sleeper 1, 1', such parameters and steps being discussed hereinafter.

Generally speaking, during the extrusion process, one should permit compaction of the composition (structure that forms the sleeper 1,1') used within the calibrator of the extruder and homogenous cooling of the whole thickness of the piece.

The process proposed comprises the initial step of adding the composition used (preferably polypropylene with fiberglass) to the feeder of the extruding machine and then regulate temperature parameter of the head (melting zone) to meet the characteristics of the material.

Concomitantly with the above step, one should add the first pure polymeric material (pure polypropylene, without fiberglass) to an extruding machine and melt it.

Then, one should add in the extruding machine, at the same time (at the same head), the (pure) molten polypropylene together with the composition of polypropylene with fiberglass.

After this, one should coat the composition of polypropylene with fiberglass with pure polypropylene, thus establishing a structure with the arrangement of the inner 13 and outer 14 walls in pure polypropylene and the intermediate layer 15 in polypropylene and fiberglass. Thus one establishes a structure similar to the extrusion process known as ABA, in which the first layer (layer A) consists of a determined material (in this case, pure polypropylene), the intermediate layer (layer B) consists of another material, in this case a composition of polypropylene with fiberglass, and the third layer consists again of the material A, pure polypropylene.

It should be pointed out that the manufacture of the inner 13 and outer 14 walls from the same material used in making the intermediate layer 15 (in this case, polypropylene) is just a preferred characteristic of the present invention. Thus, the walls 13 and 14 might be made from a material other than that used in the layer 15, as long as obviously it provides the necessary adherence to the piece.

Following the description of the proposed steps, after melting the structure within the cannon and the screw of the extruding machine, the molten structure is extruded within the matrix, said matrix having the main function of shaping the structure to a desired shape.

Subsequently, the structure, upon coming out of the matrix, passes through calibrator provided with a water-based cooling system. Said cooling system aims at keeping the molten structure in its final shape, besides aiding in cooling the piece.

Upon coming out of the calibrator, the piece gets into a system for controlling the velocity of the extruding machine, thus limiting the flowrate of the process and enabling compaction of the structure within the calibrator, thus preventing bubbles and loss of material. Finally, the molten structure) is cut into a desired size.

It is important to point out that the use of the composition of polypropylene with fiberglass in the intermediate layer 15 should be considered only as a preferred characteristic of the process described, so that any material (composition) having a bending module higher than or equal to 5000 MPa might be used.

Additionally, the composition of polypropylene with fiberglass preferably used comprises, preferably, fiberglass in the range from 5% to 40% by mass, and more preferably from 33% to 37% by mass of fiberglass.

Depending on the desired shape for the railroad sleeper 1, 1', the calibrator of the extruder may be configured as a calibrator with or without vacuum. On calibrators without vacuum, one proposes a preferred length from 0.3 to 0.5 meters, while on a calibrator with vacuum, one proposes a preferred length between 1 and 4 meters and vacuum of the cooling chamber from 0 to 0.4 bar.

It is pointed out that a calibrator without vacuum should be preferably used for shaping the railroad sleeper 1 whose hollow sector 4 is delimited by the free portion 17.

On the other hand, a calibrator with vacuum is preferably used in shaping the sleeper 1' whose hollow sector 4 is delimited by the support surface 3.'

Additionally, the following preferred parameters for the extruding machine are proposed:
- temperature of the extruder preferably ranging from 220° C. to 250° C.;
- amperage of the extruder ranging from 25 to 350 A;
- pressure of the head preferably ranging from 15 5 to 70 bar;
- velocity of the extruding machine (velocity of the line) ranging from 0.1 to 0.5 meters/minute;
- rotation of the screw preferably ranging from 10 to 45 rotations per minute (rpm);
- productivity of the extruding machine preferably ranging from 0.1 to 0.8 k/meter;

Although the process of shaping the railroad sleeper 1, 1' has been referred to as an extrusion process, one should understand that such a characteristic is just a preferred embodiment of the present invention, so that other processes might be used for structural shaping of the proposes sleeper 1, such as an intrusion, injection or pultrusion process.

A preferred example of embodiment having been described, one should understand that the scope of the present invention embraces other possible variations, being limited only by the contents of the accompanying claims, which include the possible equivalents.

What is claimed is:

1. A railroad sleeper (1) for fastening of at least one pair of rails (2,2') of a railroad network, the railroad sleeper (1) comprising a contact surface (3), wherein each rail of the pair of rails (2, 2') is fixed spaced apart from each other, the railroad sleeper (1) comprising a hollow sector (4) delimited by association of the contact surface (3) with parallel anchorage walls (5,5'), thus establishing a free portion (17) adjacent to the anchorage walls (5.5') and opposite the contact surface (3), wherein the contact surface (3) and the anchorage walls (5, 5') establish an inner wall (13), an outer wall (14) and an intermediate layer (15) of the railroad sleeper (1), so that:

the inner (13) and outer (14) walls of the railroad sleeper (1) are manufactured from a first polymeric material, and the intermediate layer (15) is manufactured from a polymeric composition comprising a bending module higher than or equal to 5000 Mpa, and wherein at least fixation blocks (10) or metallic plates (22, 22') are arranged at portions of the hollow sector (4) opposite the point of arrangement of the rails on the contact surface (3).

2. The railroad sleeper (1) according to claim 1, wherein the first material is polypropylene, and the intermediate layer (15) is manufactured from a composition of polypropylene with fiberglass.

3. The railroad sleeper (1) according to claim 1, wherein the intermediate layer (15) is manufactured from a composition of polypropylene with 5% to 40% by mass of fiberglass.

4. The railroad sleeper (1) according to claim 1, wherein a first width (L1) of the railroad sleeper is defined by the distance between the anchorage walls (5,5'), the anchorage walls (5,5') further comprising support points (7,7',8,8') opposite the points of association between the contact surface (3) and the anchorage walls (5,5'), the distance between the support points (7,7', 8,8') defining a second width ($L_2$) of the railroad sleeper (1).

5. The railroad sleeper (1) according to claim 4, wherein the association between the contact surfaces (3), anchorage walls (5, 5') and support (7,7',8,8') takes place by means of a segment in curve.

6. The railroad sleeper (1) according to claim 4, wherein the support points (7,7', 8,8') are configured as simple support points (7, 7'), wherein the first width ($L_1$) of the railroad sleeper (1) is equal to the second width ($L_2$) of the railroad sleeper (1).

7. The railroad sleeper (1) according to claim 4, wherein the support points (7,7', 8,8') are configured as double support points (8, 8'), wherein the first width ($L_1$) of the railroad sleeper is equal to or smaller than the second width ($L_2$) of the railroad sleeper (1).

8. The railroad sleeper (1) according to claim 7, wherein the double support points (8, 8') protrude at least out of or into the hollow sector (4) of the railroad sleeper (1), wherein the double support points, when they protrude only into the hollow sector (4), establish the second width ($L_2$) equal to the first width ($L_1$) of the railroad sleeper (1).

9. The railroad sleeper (1) according to claim 7, wherein the double support points (8, 8') protrude out of and into the hollow sector (4) of the railroad sleeper (1).

10. The railroad sleeper (1) according to claim 1, wherein the contact surface (3) protrudes beyond the anchorage walls (5, 5').

11. The railroad sleeper (1) according to claim 1, further comprising at least a support groove (9), each of the support grooves (9) protruding from the contact surface (3) to the hollow sector (4) of the railroad sleeper (1).

12. The railroad sleeper (1) according to claim 1, wherein the support grooves (9) further protrude from at least one of the anchorage walls (5, 5') to the hollow sector (4) of the railroad sleeper (1).

13. The railroad sleeper (1) according to claim 1, wherein the anchorage walls (5, 5') further comprise a plurality of anchorage teeth (12), the plurality of anchorage teeth (12) arranged on the anchorage walls (5, 5') that are not adjacent the hollow sector (4) of the railroad sleeper (10).

14. The railroad sleeper (1) according to claim 1, wherein the contact surface (3) is a plane surface.

15. A railroad sleeper (1') for fixation to at least one pair of rails (2, 2') of a railroad network, the railroad sleeper (1') comprising a contact surface (3), wherein each rail of the pair of rails (2,2') is fixed spaced apart from each other and further comprising a support surface (3') opposite the contact surface (3), the railroad sleeper (1') comprising a hollow sector (4) delimited by association of the contact surface (3) with the support surface (3') and by means of anchorage walls (5,5'), wherein the contact surface (3), the support surface (3') and the anchorage walls (5, 5') establish an inner wall (13), an outer wall (14) and an intermediate layer (15) of the railroad sleeper (1), so that:

the inner (13) and outer (14) walls of the railroad sleeper (1) are manufactured from a first polymeric material, and the intermediate layer (15) is manufactured from a composition comprising a bending module higher than or equal to 5000 MPa.

16. The railroad sleeper (1') according to claim 15, wherein the first material is polypropylene, and the intermediate layer (15) is manufactured from a composition of polypropylene with fiberglass.

17. The railroad sleeper (1') according to claim 15, wherein the intermediate layer (1') is manufactured from a composition of polypropylene with 5% to 40% by mass of fiberglass.

18. The railroad sleeper (1') according to claim 15, wherein the first width ($L_1$) of the railroad sleeper is defined by the distance between the anchorage walls (5, 5'), the anchorage walls (5, 5') further comprising support points (7,7', 8,8') opposite the points of association between the contact surface (3) and the anchorage walls (5, 5'), the distance between the support points (7,7', 8,8') defining a second width ($L_2$) of the railroad sleeper (1).

19. The railroad sleeper (1') according to claim 18, wherein the support points (7,7', 8,8') are configured as simple support points (7, 7'), wherein the first width ($L_1$) of the railroad sleeper (1) is equal to the second width ($L_2$) of the railroad sleeper (1).

20. The railroad sleeper (1') according to claim 18, wherein the support points (7,7',8,8') are configured as double support points (8, 8'), wherein the first width ($L_1$) of the railroad sleeper is smaller than the second width ($L_2$) of the railroad sleeper (1), the double support points (8,8') protruding out of the hollow sector (4) of the railroad sleeper ((1').

21. The railroad sleeper (1') according to claim 18, characterized in that the contact surface (3) and the support surface (3') are plane surfaces; further the contact surface (3) and the support surface (3') protrudes beyond the anchorage walls (5, 5'), and the association between the contact surface (3), the support surface (3'), the anchorage walls (5, 5') and the support (7,7',8,8') takes place by means of a segment in curve.

22. The railroad sleeper (1') according to claim 15, further comprising at least one support groove (9), each of the support grooves (9) protruding from at least one of the contact surface (3), support surface (3') and anchorage walls (5, 5') toward the hollow sector (4) of the railroad sleeper (1').

23. The railroad sleeper (1') according to claim 15, wherein the anchorage walls (5, 5') further comprise a plurality of anchorage teeth (12), the plurality of anchorage teeth (5, 5') being arranged at the portions of the anchorage walls (5, 5') that are not adjacent to the hollow sector (4) of the railroad sleeper (1).

24. The railroad sleeper (1') according to claim 15, wherein at least fixation blocks (10) or metallic plates (22,22') are arranged in portions of the hollow sector (4) opposite the point of arrangement of the rails on the contact surface (3).

* * * * *